(12) United States Patent
Hasegawa et al.

(10) Patent No.: US 11,303,406 B2
(45) Date of Patent: Apr. 12, 2022

(54) TRANSMITTING APPARATUS AND RECEIVING APPARATUS

(71) Applicant: Mitsubishi Electric Corporation, Tokyo (JP)

(72) Inventors: Fumihiro Hasegawa, Tokyo (JP); Akinori Taira, Tokyo (JP); Hiroki Iura, Tokyo (JP); Shigeru Uchida, Tokyo (JP); Mitsuru Mochizuki, Tokyo (JP); Tadahiro Shimoda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 89 days.

(21) Appl. No.: 16/490,450

(22) PCT Filed: Apr. 27, 2017

(86) PCT No.: PCT/JP2017/016817
§ 371 (c)(1),
(2) Date: Aug. 30, 2019

(87) PCT Pub. No.: WO2018/198287
PCT Pub. Date: Nov. 1, 2018

(65) Prior Publication Data
US 2020/0052840 A1    Feb. 13, 2020

(51) Int. Cl.
*H04L 5/00* (2006.01)
*H04W 72/04* (2009.01)

(52) U.S. Cl.
CPC .......... *H04L 5/0048* (2013.01); *H04L 5/0007* (2013.01); *H04L 5/0023* (2013.01); *H04L 5/0053* (2013.01); *H04W 72/042* (2013.01)

(58) Field of Classification Search
CPC ... H04L 5/0048; H04L 5/0007; H04L 5/0023; H04L 5/0053; H04L 5/0037;
(Continued)

(56) References Cited

U.S. PATENT DOCUMENTS

2010/0246527 A1* 9/2010 Montojo ............... H04L 5/0051
370/330
2011/0307611 A1* 12/2011 Callard .................. H04L 5/005
709/226
(Continued)

FOREIGN PATENT DOCUMENTS

| JP | 2012-523171 A | 9/2012 |
| JP | 2016-518758 A | 6/2016 |
| KR | 10-2011-0007986 A | 1/2011 |

OTHER PUBLICATIONS

Office Action dated Jun. 9, 2020 in corresponding Japanese Patent Application No. 2019-514999.
(Continued)

*Primary Examiner* — Will W Lin
(74) *Attorney, Agent, or Firm* — Birch, Stewart, Kolasch & Birch, LLP

(57) ABSTRACT

The base station allocates, to one terminal, at least one transmission layer and allocates at least one resource block that is a minimum allocation unit of a communication resource in each transmission layer, to transmit a signal to the terminal, and includes processing units each associated with one of the transmission layers, the processing units being equal in number to the transmission layers. Each processing unit includes a reference signal generation unit to generate a reference signal to be used by the terminal in demodulation processing on a received signal, and an information processing unit to determine an arrangement of the resource block in which to transmit the reference signal to the terminal, based on at least one of a state of a channel between the base station and the terminal or information on the resource block to be used in transmission of the reference signal in an adjacent cell.

11 Claims, 16 Drawing Sheets

(58) Field of Classification Search
CPC ............. H04L 27/2613; H04L 5/0051; H04W 72/042; H04B 7/0413
See application file for complete search history.

(56) References Cited

U.S. PATENT DOCUMENTS

| | | | |
|---|---|---|---|
| 2012/0113889 A1 | 5/2012 | Noh et al. | |
| 2014/0010131 A1* | 1/2014 | Gaal | H04L 5/0048 370/311 |
| 2014/0233466 A1 | 8/2014 | Pourahmadi et al. | |
| 2015/0319775 A1* | 11/2015 | Takeda | H04L 25/00 370/329 |
| 2016/0087709 A1 | 3/2016 | Horiuchi et al. | |
| 2019/0044599 A1* | 2/2019 | Kakishima | H04L 5/0048 |
| 2019/0173547 A1* | 6/2019 | Li | H04B 7/0617 |

OTHER PUBLICATIONS

Korean Office Action, dated Jan. 7, 2021, for Korean Appcation No. 10-2019-7031130, with an English tansiation.
Taoka et al., "Mimo and CoMP in LTE-Advanced", NTT DOCOMO Technical Journal, Sep. 2010, vol. 12, No. 2. pp. 20-28 (9 pages).
David C. Chu, "Polyphase Codes With Good Periodic Correlation Properties", IEEE Transactions on Information Theory, Jul. 1972, pp. 531-532.
Zou et al. "COFDM:An Overview", IEEE Transactions on Broadcasting, vol. 41, No. 1, Mar. 1995, pp. 1-8.
Extended European Search Report, dated Feb. 6, 2020, for European Application No. 17907571.8.
ZTE et al., "Discussion on downkink DMRS design", 3GPP TSG RAN WG1 NR Ad-Hoc Meeting, R1-1700135, Spokane, USA, Jan. 16-20, 2017, 10 pages.
Chinese Office Action dated May 26, 2021 issued in corresponding Chinese Application No. 201780089912.2 with an English machine translation.
Korean Office Action dated Jun. 24, 2021 issued in corresponding Korean Patent Application No. 10-2019-7031130 with an English machine translation.
Indian Office Action dated Oct. 4, 2021 in corresponding Indian Application No. 201947040890.

\* cited by examiner kTH RESOURCE BLOCK k+1ST RESOURCE BLOCK k+2ND RESOURCE BLOCK

FIG.5

| | One Codeword: Codeword 0 enabled, Codeword 1 disabled | | Two Codewords: Codeword 0 enabled, Codeword 1 enabled |
|---|---|---|---|
| Value | Message | Value | Message |
| 0 | 1 layer, port 7, $n_{SCID}$=0 (OCC=2) | 0 | 2 layer, port 7-8, $n_{SCID}$=0 (OCC=2) |
| 1 | 1 layer, port 7, $n_{SCID}$=1 (OCC=2) | 1 | 2 layer, port 7-8, $n_{SCID}$=1 (OCC=2) |
| 2 | 1 layer, port 8, $n_{SCID}$=0 (OCC=2) | 2 | 2 layer, port 7-8, $n_{SCID}$=0 (OCC=4) |
| 3 | 1 layer, port 8, $n_{SCID}$=1 (OCC=2) | 3 | 2 layer, port 7-8, $n_{SCID}$=1 (OCC=4) |
| 4 | 1 layer, port 7, $n_{SCID}$=0 (OCC=4) | 4 | 2 layer, port 11, 13, $n_{SCID}$=0 (OCC=4) |
| 5 | 1 layer, port 7, $n_{SCID}$=1 (OCC=4) | 5 | 2 layer, port 11, 13, $n_{SCID}$=1 (OCC=4) |
| 6 | 1 layer, port 8, $n_{SCID}$=0 (OCC=4) | 6 | 3 layer, port 7-9 |
| 7 | 1 layer, port 8, $n_{SCID}$=1 (OCC=4) | 7 | 4 layer, port 7-10 |
| 8 | 1 layer, port 11, $n_{SCID}$=0 (OCC=4) | 8 | 5 layer, port 7-11 |
| 9 | 1 layer, port 11, $n_{SCID}$=1 (OCC=4) | 9 | 6 layer, port 7-12 |
| 10 | 1 layer, port 13, $n_{SCID}$=0 (OCC=4) | 10 | 7 layers, ports 7-13 |
| 11 | 1 layer, port 13, $n_{SCID}$=1 (OCC=4) | 11 | 8 layers, ports 7-14 |
| 12 | 2 layers, ports 7-8 | 12 | Reserved |
| 13 | 3 layers, ports 7-9 | 13 | Reserved |
| 14 | 4 layers, ports 7-10 | 14 | Reserved |
| 15 | Reserved | 15 | Reserved | kTH RESOURCE BLOCK k+1ST RESOURCE BLOCK k+2ND RESOURCE BLOCK k+3RD RESOURCE BLOCK kTH RESOURCE BLOCK k+1ST RESOURCE BLOCK k+2ND RESOURCE BLOCK k+3RD RESOURCE BLOCK kTH RESOURCE BLOCK k+1ST RESOURCE BLOCK k+2ND RESOURCE BLOCK k+3RD RESOURCE BLOCK k+4TH RESOURCE BLOCK k+5TH RESOURCE BLOCK kTH RESOURCE BLOCK k+1ST RESOURCE BLOCK k+2ND RESOURCE BLOCK k+3RD RESOURCE BLOCK kTH RESOURCE BLOCK k+1ST RESOURCE BLOCK k+2ND RESOURCE BLOCK k+3RD RESOURCE BLOCK

FIG.14
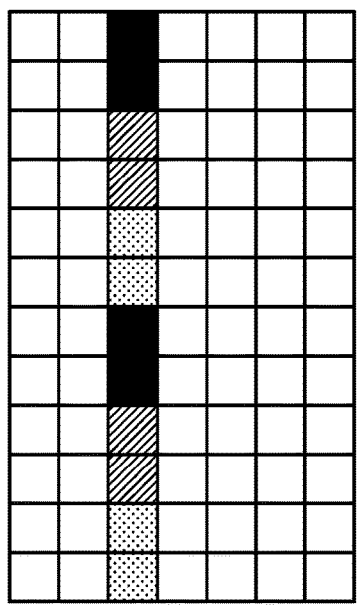
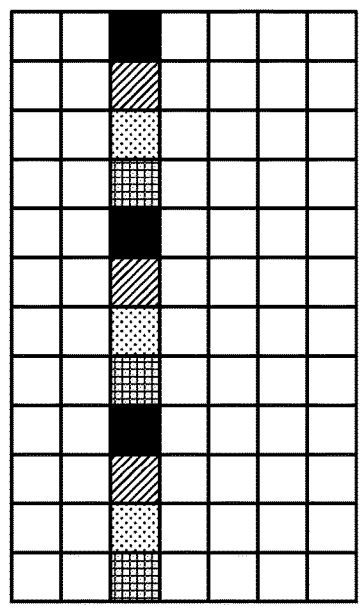
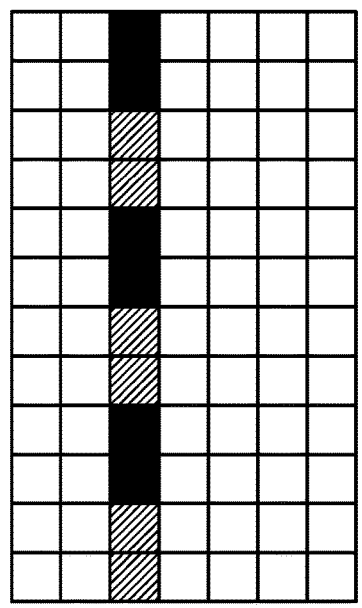
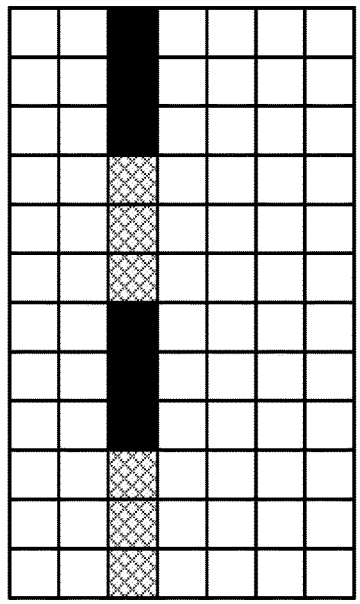
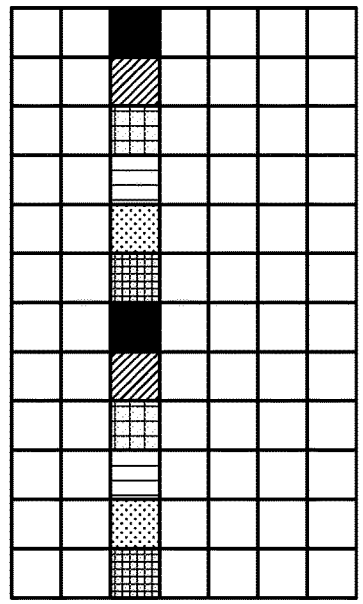
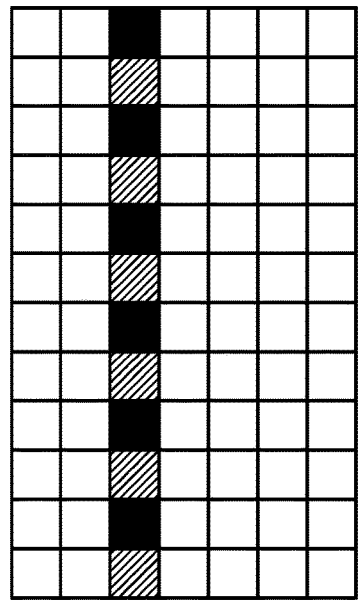

FIG.15
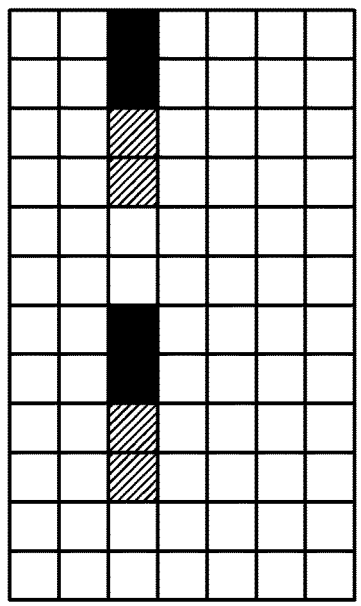
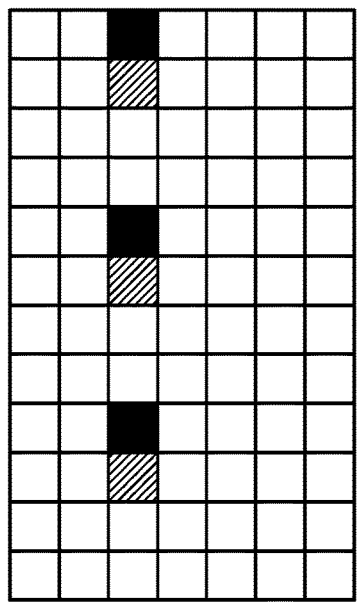
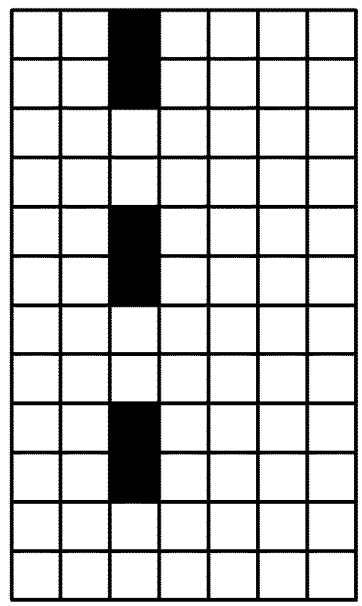
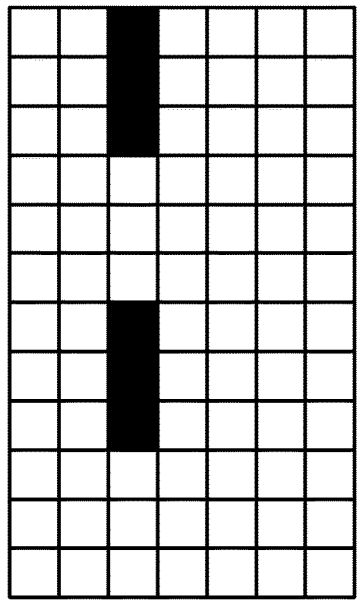
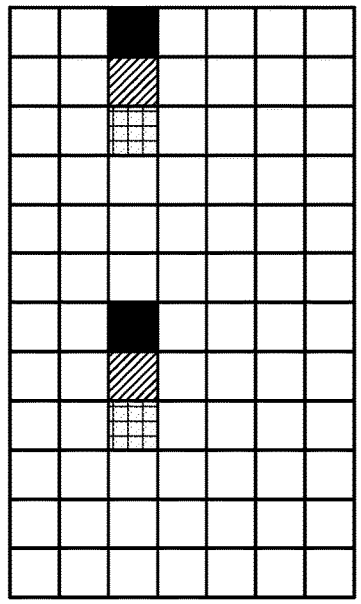
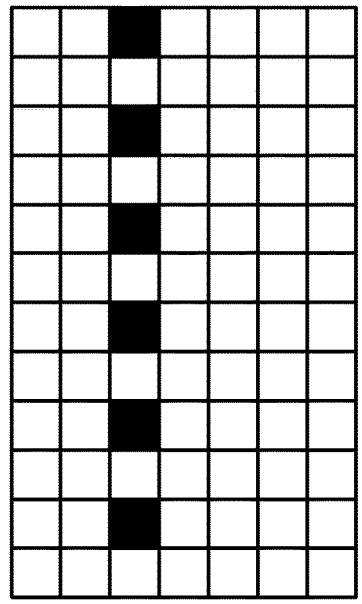

PORT NUMBERS 0-5
PORT NUMBERS 6-11

TRANSMITTING APPARATUS AND RECEIVING APPARATUS

FIELD

The present invention relates to a transmitting apparatus and a receiving apparatus for multicarrier block transmission.

BACKGROUND

In a digital communication system, frequency selectivity and time fluctuations of a channel occur due to multipath fading caused by a transmission signal reflected from a building or the like or Doppler effect fluctuations caused by the movement of a communication apparatus. In a multipath environment where multipath fading occurs, a signal received by a communication apparatus is a signal in which a transmission symbol directly arriving from a transmission-source communication apparatus interferes with a symbol arriving late after being reflected from a building or the like.

In order to obtain the best reception characteristic in such a frequency-selective channel, an Orthogonal Frequency Division Multiplexing (OFDM) transmission scheme that is Multiple Carrier (MC) block transmission (for example, see Non Patent Literature 1 below) is used.

As a technology for improving communication capacity, there is a Multiple Input Multiple Output (MIMO) wireless transmission scheme that uses a plurality of transmitting and receiving antennas. In MIMO communication, there are a scheme of multiplexing transmission layers to improve communication capacity and a scheme of multiplexing transmission layers to transmit signals to a plurality of users in parallel. The latter is called multi-user MIMO. In multi-user MIMO, a plurality of transmission layers for a plurality of users are multiplexed on the transmitting side. Multi-user MIMO can also multiplex a plurality of transmission layers per user to improve communication capacity. A transmission layer is a unit of spatially multiplexed signals and is also called a stream. Hereinafter, multiplexing of signals of a plurality of transmission layers is referred to as layer multiplexing.

Layer multiplexing is generally performed on the transmitting side using precoding. Precoding is performed using a channel estimation value of a channel that is seen from the transmitting side to the receiving side. Thus, the communication apparatus on the transmitting side generates and transmits a signal in which a reference signal usable for channel estimation is inserted so that the communication apparatus on the receiving side can estimate the channel and perform feedback to the transmitting side. The reference signal is also used in demodulating multiplexed signals. There are several types of reference signals. The standards group 3rd Generation Partnership Project (3GPP) defines a plurality of reference signals, one of which is a Demodulation Reference Signal (DMRS) that is transmitted after being subjected to precoding processing. Consequently, the communication apparatus on the receiving side can estimate the precoding processing performed on the transmitting side and the channel, using the DMRS. The DMRS is also called a reference signal for demodulation.

In general, in multi-user MIMO, a unique reference signal is assigned to each transmission layer and each user. In this case, by using a reference signal assigned to a transmission layer in which a signal is transmitted to the communication apparatus on the receiving side, the apparatus can perform channel estimation on the transmission layer and demodulate the signal received.

CITATION LIST

Non Patent Literature

Non Patent Literature 1: W. Y. Zou and Y. Wu, "COFDM: An overview", IEEE Trans. on Broadcasting, vol. 41, no. 1, March 1995, pp. 1-8.

SUMMARY

Technical Problem

In an OFDM transmission scheme, reference signals can be placed in the frequency domain and the time domain, in units of subcarriers in frequency, or Resource Elements (REs) in 3GPP. A resource element is a unit of resource allocation defined in 3GPP. By using the reference signals, the communication apparatus on the receiving side can perform channel estimation and demodulation. Here, in order to improve communication quality, it is important to perform channel estimation with high accuracy. By increasing the number of reference signals placed in the frequency domain and the time domain, channel estimation accuracy can be improved. However, as the number of reference signals placed in the frequency domain and the time domain increases, the number of resource elements available for data transmission decreases, reducing transmission efficiency. When the channel state greatly varies from frequency to frequency, the channel estimation accuracy can be improved by increasing the number of reference signals. When there are no significant differences in channel state between frequencies, the channel estimation accuracy cannot be improved by increasing the number of reference signals, resulting in a reduction in transmission efficiency. Thus, an appropriate number of reference signals, that is, an appropriate density of reference signals in a certain region, depends on the channel state. When the density of reference signals is made higher than necessary, the transmission efficiency is reduced. When the density of reference signals is made lower than necessary, communication quality is reduced.

The present invention has been made in view of the above. It is an object of the present invention to provide a transmitting apparatus capable of preventing reductions in communication quality and transmission efficiency.

Solution to Problem

In order to solve the above-described problem and achieve the object, an aspect of the present invention is a transmitting apparatus that allocates, to one terminal, at least one of a plurality of transmission layers and allocates at least one resource block that is a minimum allocation unit of a communication resource in each transmission layer, to transmit a signal to the terminal, the transmitting apparatus including: processing units each associated with one transmission layer of the plurality of transmission layers, the processing units being equal in number to the transmission layers. Each of the processing units includes: a reference signal generation unit to generate a reference signal to be used by the terminal in demodulation processing on a received signal; and an information processing unit to determine an arrangement of the resource block in which to transmit the reference signal to the terminal, on a basis of at least one of a state of a channel between the transmitting apparatus and the terminal or information on the resource block to be used in transmission of the reference signal in an adjacent cell.

Advantageous Effects of Invention

The transmitting apparatus according to the present invention has an advantage of being able to prevent reductions in communication quality and transmission efficiency.

BRIEF DESCRIPTION OF DRAWINGS

FIG. 5 is a diagram illustrating an example of a table used when the base station according to the first embodiment notifies a terminal of a port number(s).

FIG. 14 is a diagram illustrating an example of DMRS arrangement patterns in an RB.

FIG. 15 is a diagram illustrating another example of DMRS arrangement patterns in an RB.

DESCRIPTION OF EMBODIMENTS

Hereinafter, a transmitting apparatus and a receiving apparatus according to embodiments of the present invention will be described in detail with reference to the drawings. Note that these embodiments are not intended to limit this invention.

First Embodiment

Figure 1:
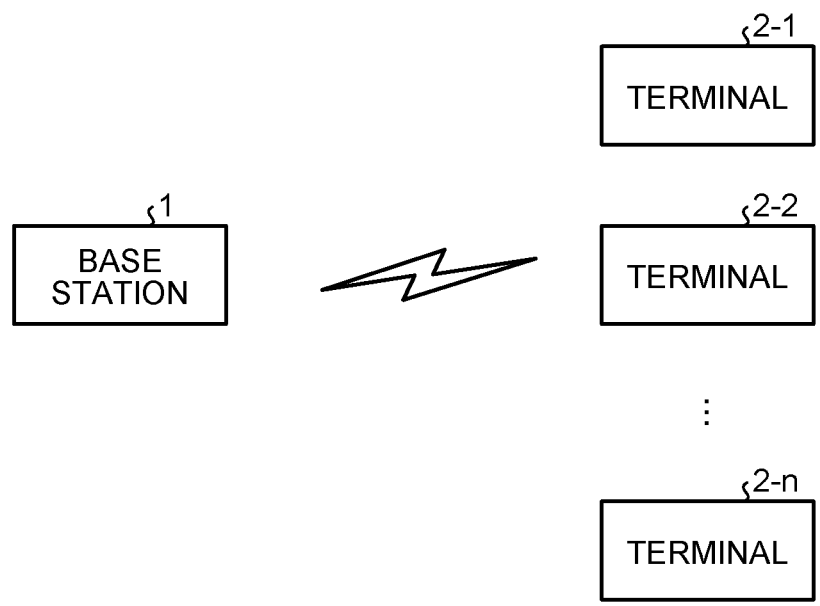
FIG. 1 is a diagram illustrating an example configuration of a communication system according to a first embodiment.

FIG. 1 is a diagram illustrating an example configuration of a communication system according to a first embodiment of the present invention. The communication system of the present embodiment includes a base station 1 and terminals 2-1 to 2-$n$ that are an example of one or more terminals, where n is an integer greater than or equal to one. In the following description, when the terminals 2-1 to 2-$n$ are not distinguished, each of the terminals 2-1 to 2-$n$ is described as a terminal 2. The terminals 2-1 to 2-$n$ are sometimes collectively described as a plurality of terminals 2.

The terminal 2 is a communication apparatus also called a user terminal or User Equipment (UE), and performs demodulation processing on a data signal received from the base station 1, using a reference signal. A channel from the base station 1 to the terminal 2 is called a downlink, and a channel from the terminal 2 to the base station 1 is called an uplink. In downlink communication, the base station 1 is a transmitting apparatus and the terminal 2 is a receiving apparatus. In uplink communication, the terminal 2 is a transmitting apparatus and the base station 1 is a receiving apparatus. The communication system according to the present embodiment uses an OFDM scheme in downlink communication. Therefore, symbols in the downlink of the communication system according to the present embodiment are OFDM symbols. Also, the communication system according to the present embodiment uses a multi-user MIMO scheme in downlink communication. Thus, the base station 1 can form a beam directed to a plurality of terminals 2 by performing precoding on transmission signals transmitted from a plurality of antennas. Although the following describes an example in which the communication system performs layer multiplexing using the multi-user MIMO scheme, the present invention is not limited to the multi-user MIMO scheme. The communication system may use another scheme capable of layer multiplexing.

The present embodiment describes downlink communication, that is, communication in which the base station 1 operates as a transmitting apparatus and the terminal 2 operates as a receiving apparatus. Uplink communication is the same as the conventional one, and thus will not be described in detail.

Figure 2:
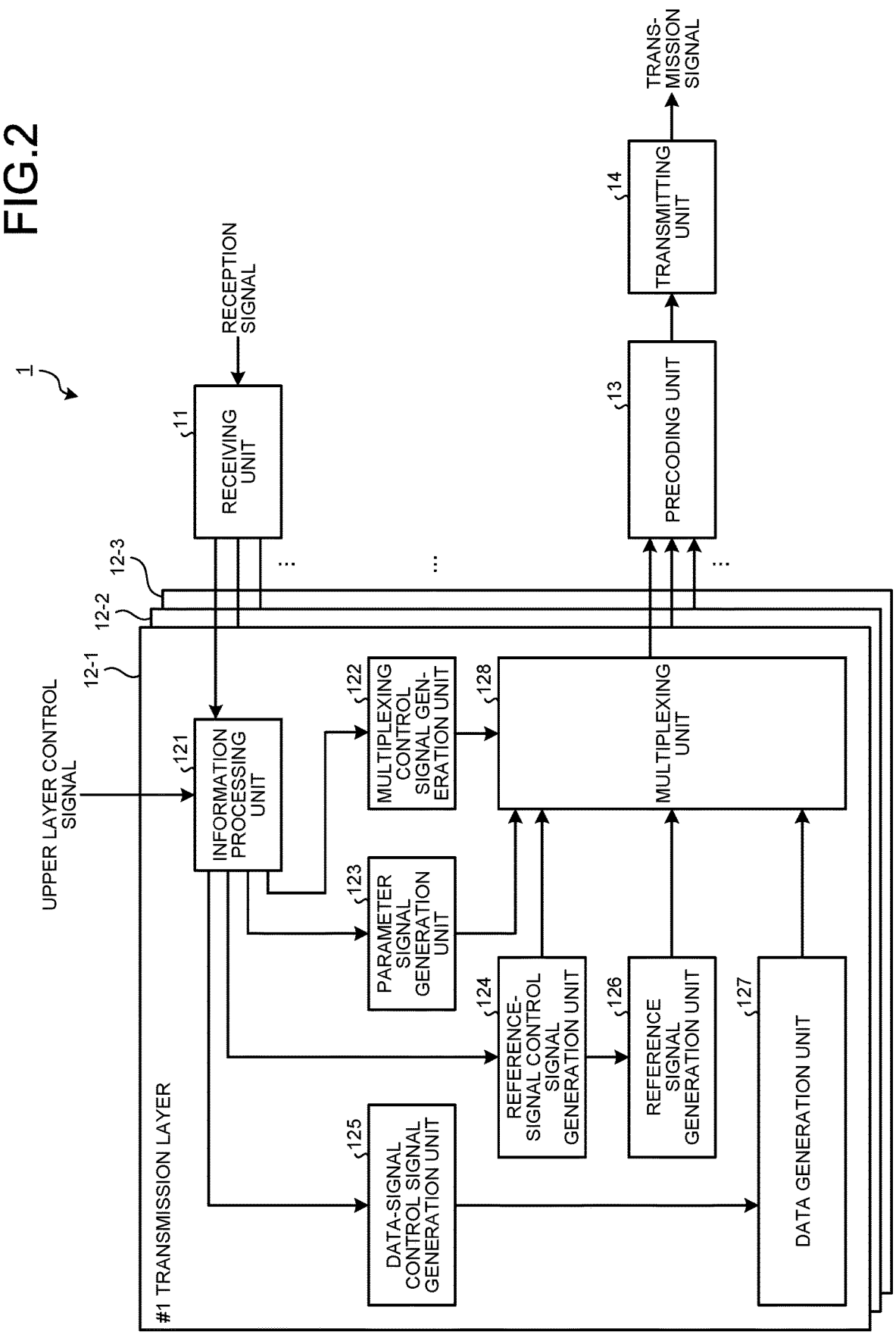
FIG. 2 is a diagram illustrating an example configuration of a base station according to the first embodiment.

FIG. 2 is a diagram illustrating an example configuration of the base station 1 according to the present embodiment. The base station 1 includes a receiving unit 11, processing units 12-1, 12-2, . . . , a precoding unit 13, and a transmitting unit 14. In the following description, when the processing units 12-1, 12-2, . . . are not distinguished, each of them is described as a processing unit 12. The number of the processing units 12 is two or more, and the number of the processing units 12 agrees with the number of transmission layers. That is, the base station 1 includes as many processing units 12 as there are transmission layers. The processing units 12 have the same configuration.

When the receiving unit 11 receives signals transmitted from the terminals 2 by uplink communication, the receiving unit 11 demodulates the signals and passes the demodulated received signals to the processing units 12.

Each processing unit 12 performs reception processing on the received signal from the corresponding terminal 2, and generates a signal to be transmitted to the corresponding terminal 2 and outputs the signal to the precoding unit 13.

The reception processing includes processing to extract data and control information from the received signal, processing to pass part or all of the extracted data and control information to a processing unit for performing upper-layer processing (not illustrated), and the like. Note that the upper layer is different from the above-described transmission layers, and is an upper layer in the Open Systems Interconnection (OSI) reference model, that is, a layer upper than a layer to which the processing unit 12-$i$ ($i=1, 2, 3, \ldots$) belongs in the OSI reference model. The corresponding terminal 2 is a terminal 2 assigned to a transmission layer with which the processing unit 12 is associated. For example, the terminal 2 corresponding to the processing unit 12-1 corresponds to a terminal 2 assigned to transmission layer 1.

The processing unit 12 includes an information processing unit 121, a multiplexing control signal generation unit 122, a parameter signal generation unit 123, a reference-signal control signal generation unit 124, a data-signal control signal generation unit 125, a reference signal generation unit 126, a data generation unit 127, and a multiplexing unit 128.

The information processing unit 121 generates control signals to be output to the multiplexing control signal generation unit 122, the parameter signal generation unit 123, the reference-signal control signal generation unit 124, and the data-signal control signal generation unit 125 on the basis of the signal received from the terminal 2 via the receiving unit 11 and an upper-layer control signal described later. Although the processing unit 12 of each transmission layer individually includes the information processing unit 121 in the present embodiment, a single information processing unit 121 common to the transmission layers may be provided. That is, an information processing unit that collectively performs the processing performed by the information processing units 121 of the processing units 12 of the transmission layers may be provided outside the processing units 12, and the information processing unit may generate control signals for the multiplexing control signal generation unit 122, the parameter signal generation unit 123, the reference-signal control signal generation unit 124, and the data-signal control signal generation unit 125 of each processing unit 12.

The multiplexing control signal generation unit 122 generates a control signal for the multiplexing unit 128 on the basis of the control signal input from the information processing unit 121.

The parameter signal generation unit 123 generates a parameter signal that is a control signal containing a parameter necessary for the terminal 2 to receive a signal in the downlink, and outputs the parameter signal to the multiplexing unit 128. The parameter contained in the parameter signal indicates, for example, the arrangement of a references signal and a data signal, that is, at what frequency and at what timing a reference signal and a data signal are transmitted.

The reference-signal control signal generation unit 124 generates a control signal indicating the type of a reference signal to be transmitted to the terminal 2, and outputs the control signal to the reference signal generation unit 126.

The data-signal control signal generation unit 125 generates a control signal indicating the number of symbols of a data signal to be generated by the data generation unit 127, and outputs the control signal to the data generation unit 127.

The reference signal generation unit 126 generates a DMRS as a reference signal to be used by the terminal 2 in the demodulation processing on a received signal, and outputs the DMRS to the multiplexing unit 128.

The data generation unit 127 generates a data signal to be transmitted to the terminal 2, and outputs the data signal to the multiplexing unit 128.

The multiplexing unit 128 generates a transmission signal by multiplexing the parameter signal input from the parameter signal generation unit 123, the reference signal input from the reference signal generation unit 126, and the data signal input from the data generation unit 127 in time and frequency, and outputs the transmission signal to the precoding unit 13. The multiplexing here refers to the placement of the parameter signal, the reference signal, and the data signal in a specific region defined by time and frequency. The specific region defined by time and frequency is, for example, a Resource Block (RB) defined in 3GPP. One RB is a group consisting of twelve frequencies, that is, twelve carriers, and seven symbols. An RB is a minimum unit of communication resource allocation to the terminal 2. The base station 1 allocates one or more RBs to each terminal 2 in its own cell, and transmits downlink signals to the terminals 2 using the allocated RBs. Scheduling for allocating RBs to the terminals 2 may be performed by any existing method and will not be described here.

The precoding unit 13 performs precoding processing on a transmission signal generated by the processing unit 12 of each transmission layer, and passes the signal after the precoding processing to the transmitting unit 14. The precoding processing indicates processing to form a beam by performing weighting, phase rotation, and addition processing on a plurality of signals to be transmitted from a plurality of antennas. Thus, the precoding unit 13 prevents interference when signals to be transmitted to one or more terminals 2 are spatially multiplexed. There may be a case where there is temporarily only one terminal 2 communicating with the base station 1, which case is included in layer multiplexing.

The transmitting unit 14 includes a plurality of antennas (not illustrated). The transmitting unit 14 performs transmission processing such as multi-antenna transmission processing and wave-shaping processing on the signals received from the precoding unit 13, and transmits the signals to the terminals 2. Examples of wave-shaping processing include OFDM processing. In the OFDM processing, the transmitting unit 14 performs Inverse Discrete Fourier Transform (IDFT) processing and Cyclic Prefix (CP) addition.

Next, an operation of the base station 1 illustrated in FIG. 2 to transmit a signal to the terminal 2 will be described. In the operation of transmitting a signal to the terminal 2, the reference signal generation unit 126 generates a reference signal of a type indicated by the control signal input from the reference-signal control signal generation unit 124. The types of reference signals will be described later. The data generation unit 127 generates a data signal of the number of symbols indicated by the control signal input from the data-signal control signal generation unit 125. The parameter signal generation unit 123 generates a parameter signal in accordance with the control signal input from the information processing unit 121. The reference signal, the data signal, and the parameter signal are input to the multiplexing unit 128. The multiplexing unit 128 places these input signals in an RB according to the control signal input from the multiplexing control signal generation unit 122.

In the communication system according to the present embodiment, the arrangement of a reference signal to be transmitted by the base station 1 to the terminal 2 in a certain region defined by time and frequency, and the number of symbols of the reference signal contained in this region vary depending on the type of the reference signal, the details of which will be described later. Accordingly, the number of data symbols placed in the region defined by time and frequency varies. Therefore, in the base station 1, the reference-signal control signal generation unit 124 outputs a control signal indicating the type of reference signal to the reference signal generation unit 126. The data-signal control signal generation unit 125 outputs a control signal indicating the number of data symbols to be created to the data generation unit 127. The terminal 2 needs to know the arrangement of the reference signal and the data signal to receive the signal. Therefore, the parameter signal generation unit 123 generates a parameter signal that is a control signal for notifying the terminal 2 of the arrangement of the reference signal and the data signal. The multiplexing control signal generation unit 122 outputs, to the multiplexing unit 128, a control signal indicating the arrangement of the reference signal, the data signal, and the parameter signal on time and frequency.

The control signals output by the multiplexing control signal generation unit 122, the parameter signal generation unit 123, the reference-signal control signal generation unit 124, and the data-signal control signal generation unit 125 are generated on the basis of the control signals output by the information processing unit 121. The information processing unit 121 generates control signals to be output to the multiplexing control signal generation unit 122, the parameter signal generation unit 123, the reference-signal control signal generation unit 124, and the data-signal control signal generation unit 125, on the basis of information contained in a signal received from the terminal 2 and information contained in an upper-layer control signal received from an upper layer. That is, the information processing unit 121 determines the arrangement on time and frequency of a reference signal and a data signal to be transmitted to the terminal 2, and outputs a control signal indicating the determination results, that is, the arrangement of the signals, to the multiplexing control signal generation unit 122 and the parameter signal generation unit 123. The information processing unit 121 outputs a control signal indicating the number of symbols of a data signal to the data-signal control signal generation unit 125. The information processing unit 121 outputs a control signal indicating the type of reference signal to the reference-signal control signal generation unit 124. Here, the information contained in the signal received from the terminal 2 is information indicating the channel state of each transmission layer or the like. The information contained in the upper-layer control signal is information indicating the arrangement of the reference signal in a cell other than the cell that the base station 1 handles, or the like.

The multiplexing control signal generation unit 122 converts the control signal indicating the arrangement on time and frequency of the reference signal and the data signal input from the information processing unit 121, into a control signal of a format decodable by the multiplexing unit 128. The parameter signal generation unit 123 converts the control signal indicating the arrangement on time and frequency of the reference signal and the data signal input from the information processing unit 121, into a control signal, that is, a parameter signal of a format decodable by the terminal 2. The reference-signal control signal generation unit 124 converts the control signal indicating the type of reference signal input from the information processing unit 121 into a control signal of a format decodable by the reference signal generation unit 126. The data-signal control signal generation unit 125 converts the control signal indicating the number of symbols of the data signal input from the information processing unit 121 into a control signal of a format decodable by the data generation unit 127. Note that the multiplexing unit 128 may have the function of the multiplexing control signal generation unit 122, that is, the function of decoding the control signal input from the information processing unit 121 to eliminate the multiplexing control signal generation unit 122. Likewise, the reference signal generation unit 126 may have the function of the reference-signal control signal generation unit 124 and the data generation unit 127 may have the function of the data-signal control signal generation unit 125, to eliminate the reference-signal control signal generation unit 124 and the data-signal control signal generation unit 125.

Figure 3:
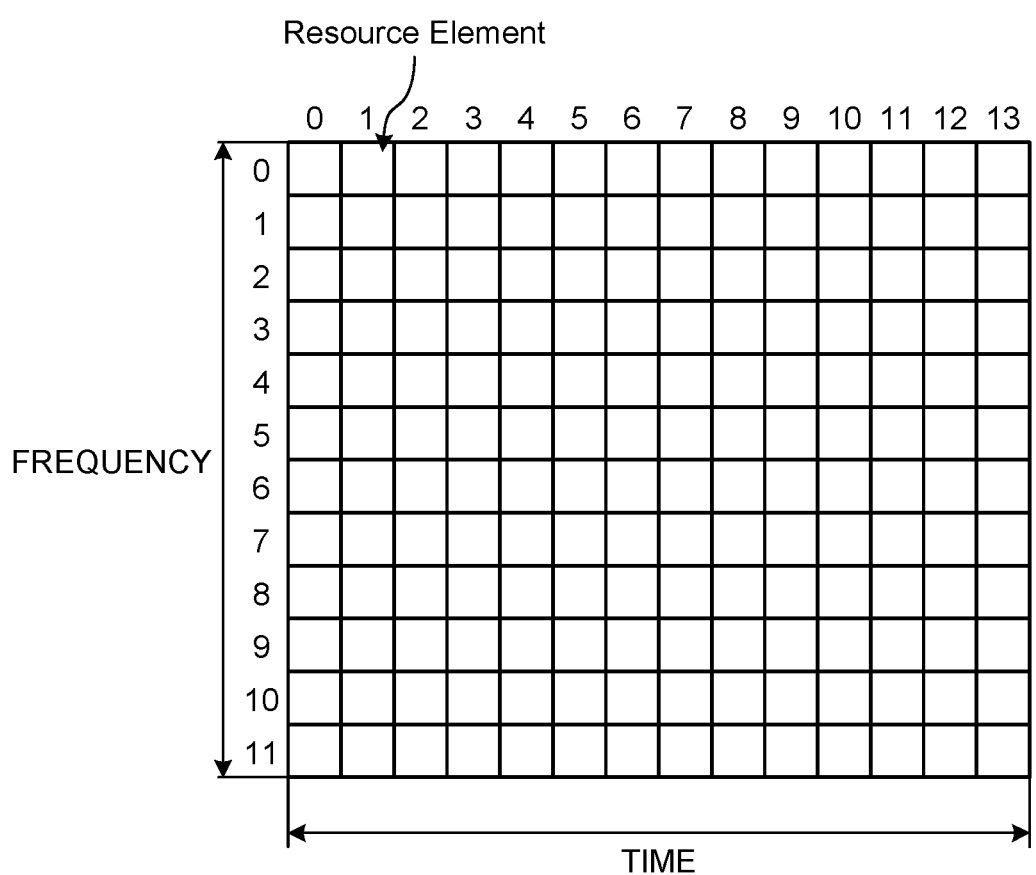
FIG. 3 is a diagram illustrating a region in which reference signals, data signals, and parameter signals are placed in the communication system according to the first embodiment.

FIG. 3 is a diagram illustrating a region where a reference signal, a data signal, and a parameter signal are placed. The region illustrated in FIG. 3 is defined by time and frequency. FIG. 3 illustrates an example of a region composed of two RBs arranged in a time direction. A small square represents one resource element (RE). A symbol is assigned to each RE. As described above, one RB consists of twelve carriers and seven symbols.

In the following description, the arrangement of REs is described using the coordinates illustrated in FIG. 3. The coordinates are shown in the order of (frequency, time). For example, in FIG. 3, the position indicated by an arrow with "Resource Element" is (0, 1). A unit consisting of seven symbols is called a slot. A unit in which the above-described scheduling is performed is called a scheduling unit. In the present embodiment, the scheduling unit is a slot unit.

Next, the arrangement of a reference signal transmitted from the base station 1 according to the present embodiment to the terminal 2 will be described. Here, the description is based on the assumption that the reference signal is a DMRS.

Figure 4:
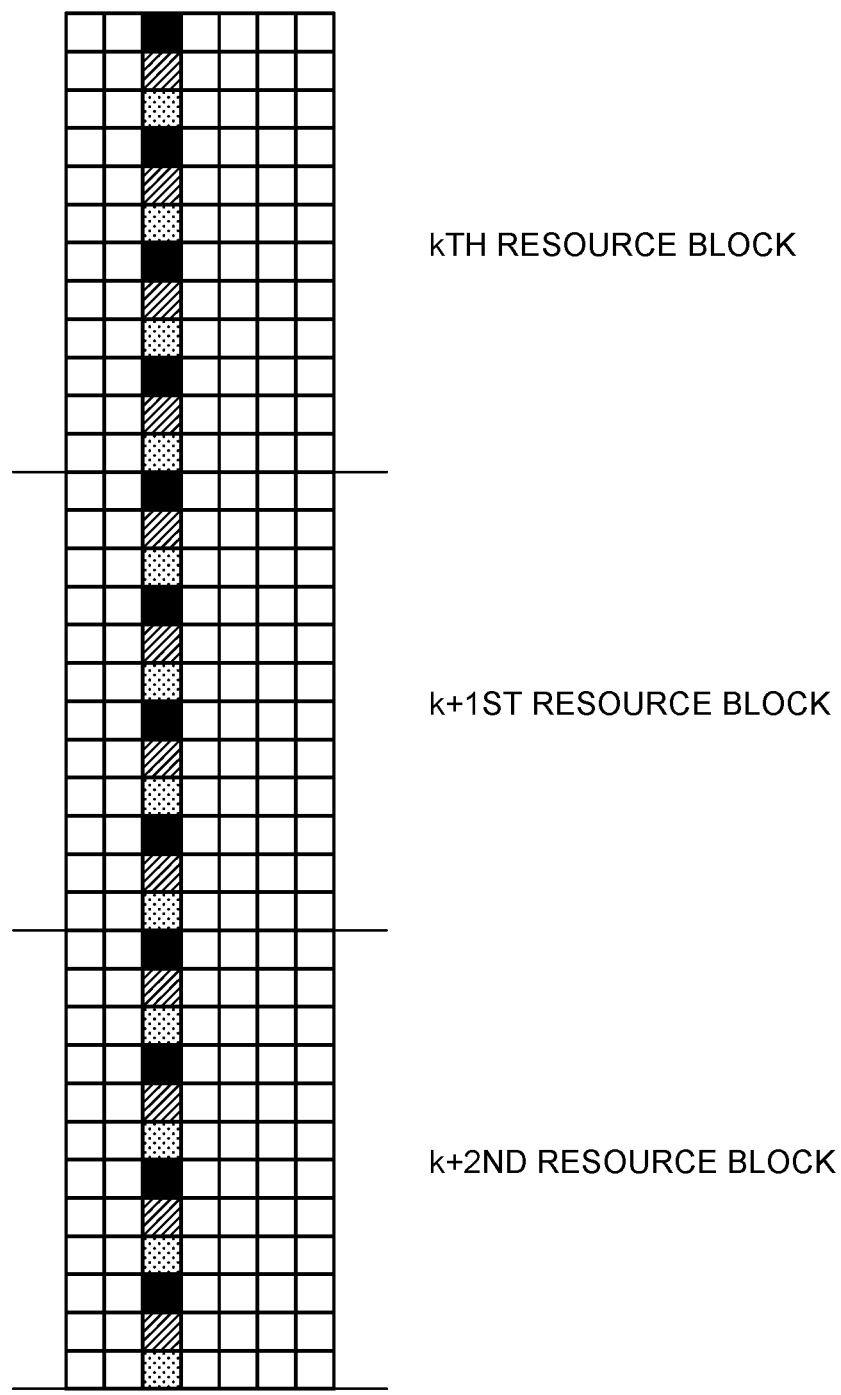
FIG. 4 is a diagram illustrating an example of a DMRS arrangement assumed in the communication system according to the first embodiment.

FIG. 4 is a diagram illustrating an example of a DMRS arrangement assumed in the communication system according to the present embodiment.

FIG. 4 illustrates an example in which three RBs are arranged in a frequency direction. The example illustrated in FIG. 4 shows that up to four DMRSs are multiplexed in four black portions in one RB. As DMRS symbols placed in the black portions, a Pseudo Noise (PN) sequence, a Zadoff Chu (ZC) sequence, or the like is used. When a PN sequence is placed, four-port multiplexing is performed using codes orthogonal to one another. Note that ports are associated with transmission layers. In each transmission layer, a DMRS is assigned to a port different from ports to which DMRSs are assigned in the other transmission layers. That is, DMRSs are assigned to different ports in different transmission layers. Since the DMRSs are in an orthogonal relationship, the receiving side can separate the transmission layers. Usually, a plurality of ports are assigned to each terminal, enabling multiplexing of a plurality of layers. When a ZC sequence described in the literature "D. C. Chu, "Polyphase codes with good periodic correlation properties", IEEE Transactions on Information Theory, vol. 18, no. 4, July 1972, pp. 531-532." is used for DMRS symbols, DMRSs multiplexed in one RB are multiplexed by using sequences obtained by cyclically shifting the ZC sequence as the DMRSs. For example, let symbols placed in (0, 2), (3, 2), (6, 2), and (9, 2) in the kth RB that is the number k resource block illustrated in FIG. 4 be $q_0$, $q_1$, $q_2$, $q_3$. When it is assumed that DMRS symbols are PN sequences and four ports are multiplexed, a DMRS corresponding to a first port is $+q_0$, $+q_1$, $+q_2$, $+q_3$, a DMRS corresponding to a second port is $+q_0$, $-q_1$, $+q_2$, $-q_3$, a DMRS corresponding to a third port is $+q_0$, $+q_1$, $-q_2$, $-q_3$, and a DMRS corresponding to a fourth port is $+q_0, -q_1, -q_2, +q_3$. On the other hand, when a ZC sequence is used, letting $q_0, q_1, q_2, q_3$ be the ZC sequence, a DMRS to a first port is $q_0, q_1, q_2, q_3$, a DMRS to a second port is $q_1, q_2, q_3, q_0$, a DMRS to a third port is $q_2, q_3, q_0, q_1$, and a DMRS to a fourth port is $q_3, q_0, q_1, q_2$.

Although the case where the DMRSs are placed in the black portions illustrated in FIG. 4 has been described, the DMRSs may be placed in other portions, specifically, (1, 2), (4, 2), (7, 2), and (10, 2) and (2, 2), (5, 2), (8, 2), and (11, 2).

A port number(s) assigned to each terminal 2 is(are) notified to the terminal 2 using a Downlink Control Information (DCI) table or the like transmitted to the terminal 2 in Layer 1 of the OSI reference model. The DCI table is defined in the literature "3GPP TS 36.212 V14.0.0", and has the configuration illustrated in FIG. 5. A port number(s) assigned to each terminal 2 is(are) notified from the base station 1 to the terminal 2 using a value corresponding to the port number(s) in the DCI table illustrated in FIG. 5, for example.

The position of an OFDM symbol containing DMRSs is assumed to be fixed at the third symbol from the beginning of a slot. That is, the position of an OFDM symbol containing DMRSs in a slot is assumed to be fixed in the network. Thus, the terminal 2 can detect DMRSs by checking a predetermined position in a slot, that is, the third symbol from the beginning. However, it is not essential to fix the position of an OFDM symbol containing DMRSs in a slot. The position may be changed. In that case, the parameter signal generation unit 123 of the base station 1 generates a parameter signal containing a parameter related to the position of an OFDM symbol containing DMRSs, and outputs the parameter signal to the multiplexing unit 128. The parameter related to the position may be any information that allows the terminal 2 to identify the position of an OFDM symbol containing DMRSs. That is, the parameter related to the position may be information directly indicating the position, or may be offset information indicating an offset from a reference position in a slot. In the first and second symbols from the beginning of the slot illustrated in FIG. 4, a control signal or a data signal is inserted. The parameter signal is a type of control signal transmitted from the base station 1 to the terminal 2, and is placed in the first symbol or the second symbol from the beginning of the slot.

Figure 6:
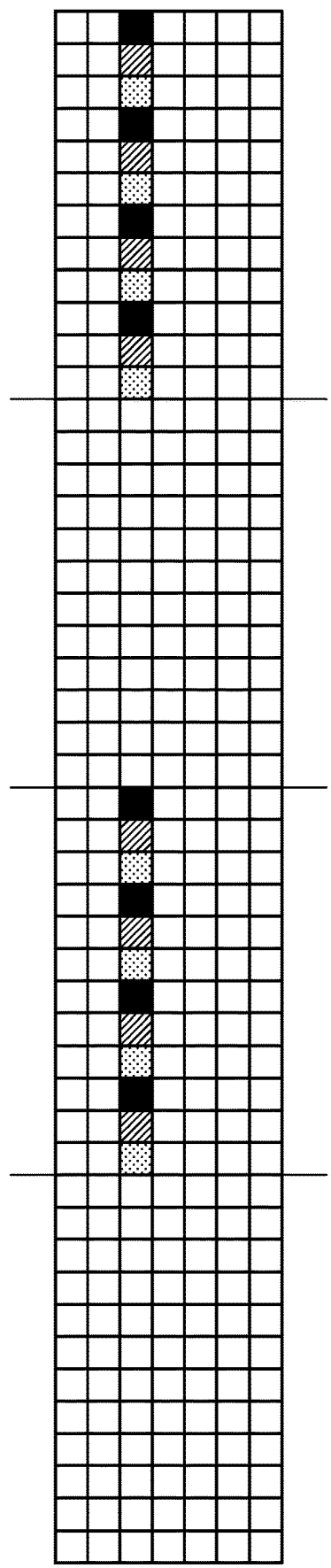
FIG. 6 is a diagram illustrating a first example of a DMRS arrangement used in the communication system according to the first embodiment.

FIG. 6 is a diagram illustrating a first example of a DMRS arrangement used in the communication system according to the present embodiment.

In the example illustrated in FIG. 6, the DMRS arrangement is a comb-like arrangement in RB units. FIG. 6 illustrates an example of the arrangement of four RBs. A number k resource block is referred to as a kth resource block. The same applies to a number k+1 resource block to a number k+3 resource block. Here, k is an integer that falls within a specified band. For example, k may be an integer from one to a hundred.

The base station 1 determines the number of RBs to be used in response to a request from each terminal 2. In the present embodiment, the base station 1 selects terminals 2 targeted for downlink transmission, and then selects DMRSs to be used. That is, in the present embodiment, when the base station 1 receives a request from each terminal 2, the base station 1 assigns DMRSs to each terminal 2 with the arrangement illustrated in FIG. 4.

In the example illustrated in FIG. 6, DMRSs are placed in the kth RB and the k+2nd RB. Assume that the kth to k+3rd RBs illustrated are allocated to one terminal 2. For example, assuming that the kth to k+3rd RBs are used in signal transmission to the terminal 2-1 illustrated in FIG. 1, the terminal 2-1 performs channel estimation using reference signals contained in the kth to k+3rd RBs, specifically, reference signals contained in the kth and k+2nd RBs, and demodulates data signals contained in the kth to k+3rd RBs. Note that in the third symbols from the heads of the k+1st and k+3rd RBs not containing DMRSs, data symbols, interference measurement zero symbols, a Channel State Information-Reference Signal (CSI-RS) that is a reference signal for channel estimation, a Phase Tracking Reference Signal (PTRS) that is a phase correction reference signal, or the like may be placed. The CSI-RS and PTRS are signals defined in 3GPP.

Figure 7:
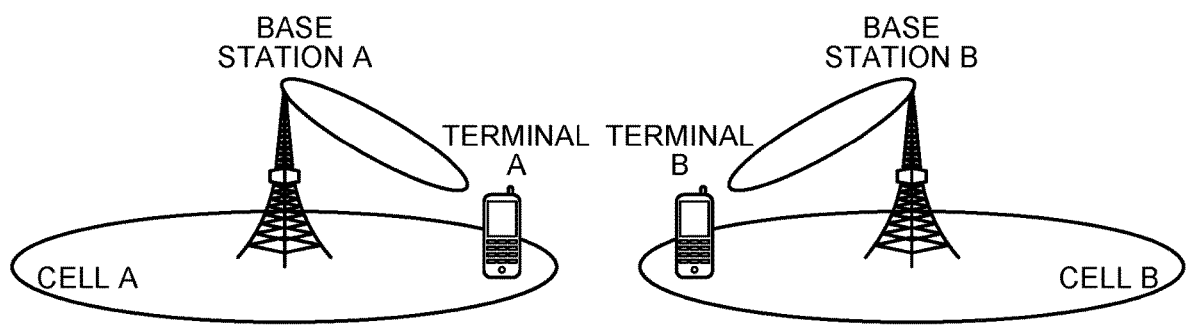
FIG. 7 is a diagram illustrating an example of the communication system according to the first embodiment.
Figure 8:
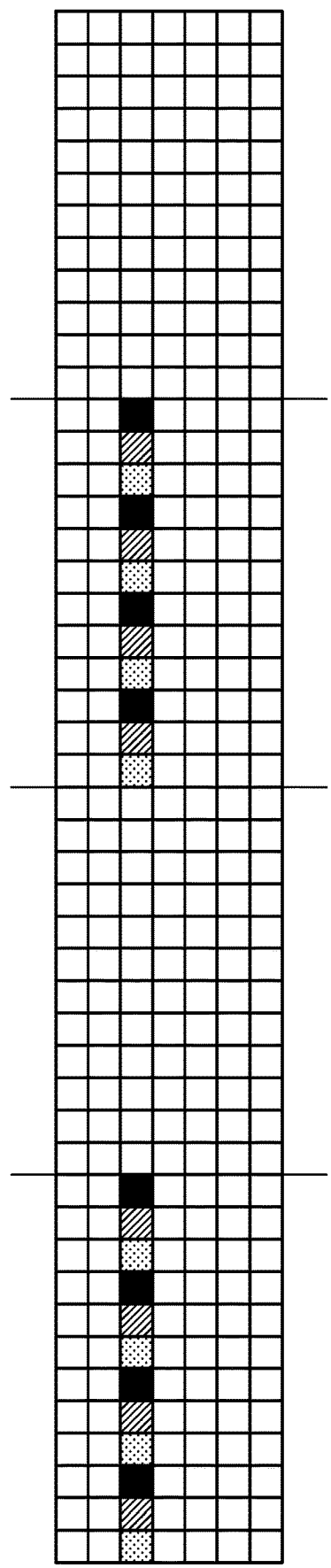
FIG. 8 is a diagram illustrating a second example of a DMRS arrangement used in the communication system according to the first embodiment.

By using the DMRS arrangement illustrated in FIG. 6, DMRSs are placed in some RBs in the same slot, and no DMRSs are placed in the other RBs. Consequently, the number of resource elements used for DMRS transmission can be reduced, improving frequency utilization efficiency. Also, by using the arrangement as illustrated in FIG. 6, interference from other cells can be avoided. For example, when a terminal is present in each of two adjacent cells and the terminals are in physically close positions as illustrated in FIG. 7, signals arriving from the adjacent cells to the terminals interfere. FIG. 7 is a diagram illustrating an example of the communication system. In the example illustrated in FIG. 7, a signal transmitted by a base station B to a terminal B in a cell B becomes an interference wave to a terminal A communicating with a base station A in an adjacent cell A. Likewise, a signal transmitted by the base station A to the terminal A in the cell A becomes an interference wave to the terminal B communicating with the base station B in the adjacent cell B. In this case, if a setting is made such that RBs containing DMRSs of the adjacent cells do not coincide with each other, interference between the cells can be avoided. For example, if a setting is made such that the base station A illustrated in FIG. 7 transmits DMRSs in the arrangement illustrated in FIG. 6 and the base station B transmits DMRSs in the arrangement illustrated in FIG. 8, occurrence of interference between the cell A and the cell B can be avoided. FIG. 8 is a diagram illustrating a second example of a DMRS arrangement used in the communication system according to the present embodiment. Comparison between the arrangement illustrated in FIG. 6 with the arrangement illustrated in FIG. 8 shows that DMRSs are located in different RBs. Since the RBs in which the DMRSs transmitted by the base station A to the terminal A are located do not coincide with the RBs in which the DMRSs transmitted by the base station B to the terminal B are located, the terminals A and B can extract the DMRSs from the RBs indicated by the parameter signals received from the base stations to perform channel estimation and data signal demodulation.

Figure 9:
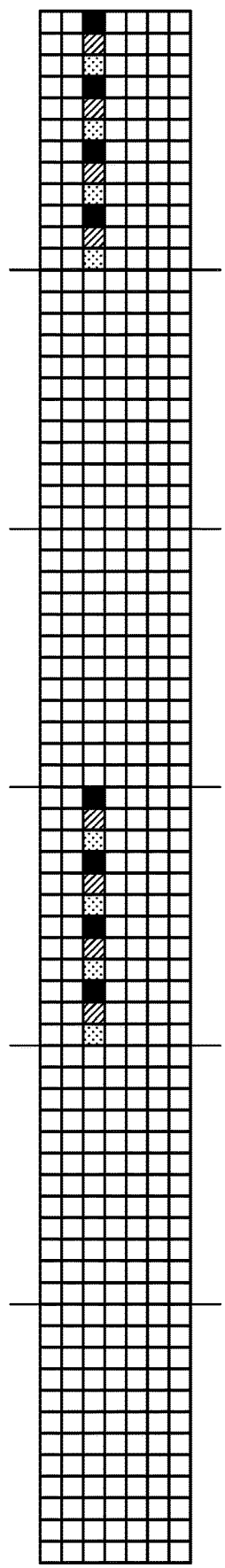
FIG. 9 is a diagram illustrating a third example of a DMRS arrangement used in the communication system according to the first embodiment.

Although DMRSs are placed in every second RB in the examples illustrated in FIGS. 6 and 8, the intervals at which DMRSs are placed, that is, the density of DMRSs, is not limited to this. For example, as illustrated in FIG. 9, DMRSs may be placed in every third RB to reduce the density of DMRSs. FIG. 9 is a diagram illustrating a third example of a DMRS arrangement used in the communication system according to the present embodiment. In the example illustrated in FIG. 9, DMRSs are located in the kth and k+3rd RBs, and no DMRSs are located in the other RBs. The DMRS arrangements as illustrated in FIGS. 6, 8, and 9 may be changed adaptively. For example, the base station 1 may adaptively change the arrangement illustrated in FIG. 6 and the arrangement illustrated in FIG. 8. The base station 1 may adaptively switch between the arrangement illustrated in FIG. 6 or 8 and the arrangement illustrated in FIG. 9 to change the DMRS arrangement and density. When adaptively switching between the DMRS arrangements, the base station 1 notifies the terminal 2 of the DMRS arrangement, using, for example, the above-described parameter signal.

The base station 1 may notify the terminal 2 of the DMRS arrangement using an upper layer or a lower layer. A case of using an upper layer corresponds, for example, to information transmission using the Radio Resource Control (RRC) of Layer 3 defined in 3GPP. That is, the base station 1 can include information on the DMRS arrangement in an RRC message and transmit it to the terminal 2. A case of using a lower layer corresponds to use of the Physical Downlink Control Channel (PDCCH) defined in 3GPP. When using the PDCCH, the DMRS arrangement information is defined as parameter information, and the base station 1 includes the DMRS arrangement information as the parameter information in the PDCCH and transmits it to the terminal 2. The PDCCH is a control channel for transmitting information of Layer 1. The base station 1 may use the Medium Access Control (MAC) layer or the like, that is, use the MAC Control Element (CE) in 3GPP transmitted in Layer 2, to transmit the DMRS arrangement information to the terminal 2. If the DMRS arrangement information is a parameter that does not change for a long period of time, the DMRS arrangement information may be transmitted from the base station 1 to the terminal 2 as a control signal of Layer 3 or Layer 2 in 3GPP. If the DMRS arrangement information is a parameter that changes in a short period of time, it may be transmitted using a control signal of Layer 1 in 3GPP. As described above, the DCI table illustrated in FIG. 5 or the like is used for notification of a port number(s), and a value corresponding to the port number(s) described in the DCI table is included in a transmission signal of Layer 1.

An example of a method by which the base station 1 notifies the terminal 2 of the DMRS arrangement will be described. The notification of the DMRS arrangement from the base station 1 to the terminal 2 is performed, for example, by setting a field of DMRS_RB_DENSITY in a specific message of a control signal to be transmitted in an upper layer or a lower layer, and using information defined like DMRS_RB_DENSITY={0, 1, 2}. In this case, for example, if DMRS_RB_DENSITY=0, it means that DMRSs are placed in all RBs. If DMRS_RB_DENSITY=1, DMRSs are placed in every second resource block as in FIG. 6. If DMRS_RB_DENSITY=2, DMRSs are placed in every third resource block as in FIG. 9.

An offset may be used to indicate the DMRS arrangement. When an offset is used, it is a parameter representing an arrangement shifted by one RB as illustrated in FIG. 8 compared with the arrangement illustrated in FIG. 6. The notification of the DMRS arrangement from the base station 1 to the terminal 2 is performed, for example, by further setting a field of DMRS_RB_OFFSET in addition to the above-described field of DMRS_RB_DENSITY in a specific message of a control signal to be transmitted in an upper layer or a lower layer, and using information defined like DMRS_RB_OFFSET={0, 1}. In this case, if DMRS_RB_DENSITY=1 and DMRS_RB_OFFSET=0, the DMRS arrangement illustrated in FIG. 6 can be indicated, and if DMRS_RB_DENSITY=1 and DMRS_RB_OFFSET=1, the arrangement as illustrated in FIG. 8 shifted by one RB compared with the arrangement illustrated in FIG. 6 can be indicated. For example, in the communication system illustrated in FIG. 7, the base station A uses the RRC to notify the terminal A of DMRS_RB_DENSITY=1 and DMRS_RB_OFFSET=0 described above, and the base station B notifies the terminal B of DMRS_RB_DENSITY=1 and DMRS_RB_OFFSET=1 described above. The names of the parameters such as DMRS_RB_DENSITY are temporary names, and the names of the parameters are not limited to them.

Note that the offset used in the setting of the DMRS arrangement may be information related to an RB arrangement, such as an even number or an odd number. For example, DMRS_RB_TYPE={0, 1} is defined. If DMRS_RB_TYPE=0, DMRSs are placed in positions where RB numbers are odd, and if DMRS_RB_TYPE=1, DMRSs are placed in positions where RB numbers are even. RB numbers here correspond to k, k+1, and k+2 illustrated in FIG. 4.

For example, letting m be a position on the frequency, black DMRS symbols in the DMRS arrangement illustrated in FIG. 4 can be expressed as follows. Here, m' is a head frequency index of the kth resource block.

m=m'+12n+0
m=m'+12n+3
m=m'+12n+6
m=m'+12n+9
n=0, 1, 2

If an offset is given, they can be represented as follows. "12*vshift" represents an offset.

m=m'+12n+0+12*vshift
m=m'+12n+3+12*vshift
m=m'+12n+6+12*vshift
m=m'+12n+9+12*vshift
n=0, 1, 2

When DMRSs are placed in two RBs as illustrated in FIG. 6, vshift={0, 1}. vshift may be derived by a cell ID or the like set by an upper layer. For example, letting N_cellID be a cell ID and an integer, vshift may be derived like "vshift=N_cellID mod 2".

Although the method of using different DMRS arrangements in adjacent cells has been described as a method for avoiding inter-cell interference in the communication system illustrated in FIG. 7, interference can be avoided even when the same DMRS arrangement is used in the cells. When the same DMRS arrangement is used in the cells, a ZC sequence used in the cell A and a ZC sequence used in the cell B are made to have different parameters. For example, letting N be an even number, a ZC sequence of an N symbol length is defined by the following formula (1).

[Formula 1]

$$a_k = e^{\frac{jM\pi k^2}{N}} \quad (1)$$

Let k=0, 1, . . . , N−1. M and N need to be disjoint. For example, when N=10, M is 1, 3, 5, 7, 9.

Letting N be an odd number, a ZC sequence of an N symbol length is defined by the following formula (2).

[Formula 2]

$$a_k = e^{\frac{jM\pi k(k+1)}{N}} \quad (2)$$

Let the sequence number of a ZC sequence be N, and the number of REs in which DMRSs are placed in an RB set to place DMRSs be X. If N<X, letting a ZC sequence(s) of a shortage of X−N be $r_n$, $r_n$ is determined by "$r_n=a_n$ mod N". That is, $a_k$ may be cyclically shifted to generate a sequence(s) of a shortage.

Sequences of $a_k$ different in M are not in an orthogonal relationship, but are characterized by low correlation values. Therefore, when base stations in different cells generate ZC sequences according to formula (1) using different Ms, and use them as DMRSs, even if the same DMRS arrangement is used in adjacent cells, the DMRSs do not become interference elements.

As described above, even sequences using the same M are brought into an orthogonal relationship if they are given cyclic shifts different from one another. Thus, a cyclic shift parameter may be varied from cell to cell. A cyclic shift on time can be produced by phase rotation on frequency. Thus, cyclic shift parameters may be exchanged between cells by indicating the amount of phase rotation in the frequency domain. In a communication system to which 3GPP is applied, a ZC sequence is used in uplink communication and phase rotation is given in the frequency domain. When a ZC sequence is used, the above-mentioned M necessary for generating ZC sequences using the above formula (1) or (2) may be derived based on a cell ID.

Although the method for avoiding inter-cell interference by using ZC sequences as DMRSs when DMRS positions of adjacent cells are the same has been described, it is also possible to use PN sequences as DMRSs to avoid inter-cell interference. That is, PN sequences in orthogonal relationship can be placed in the same position in the same RB of adjacent cells. Although it is assumed in the present embodiment that the parameter for PN sequence generation and the parameter for ZC sequence generation can be set for each terminal 2, the reference signal generation unit 126 may vary a parameter given to a shift register used for generating PN sequences from cell to cell. In that case, a cell ID may be used to derive a parameter for PN sequence generation. An example of a parameter for PN sequence generation is an initial value of the shift register for PN sequence generation. Deriving the initial value of the shift register using a cell ID lowers the correlation of PN sequences between cells. When a PN sequence is used, sequences generated by giving cyclic shifts to the PN sequence may be used at the ports.

Figure 10:
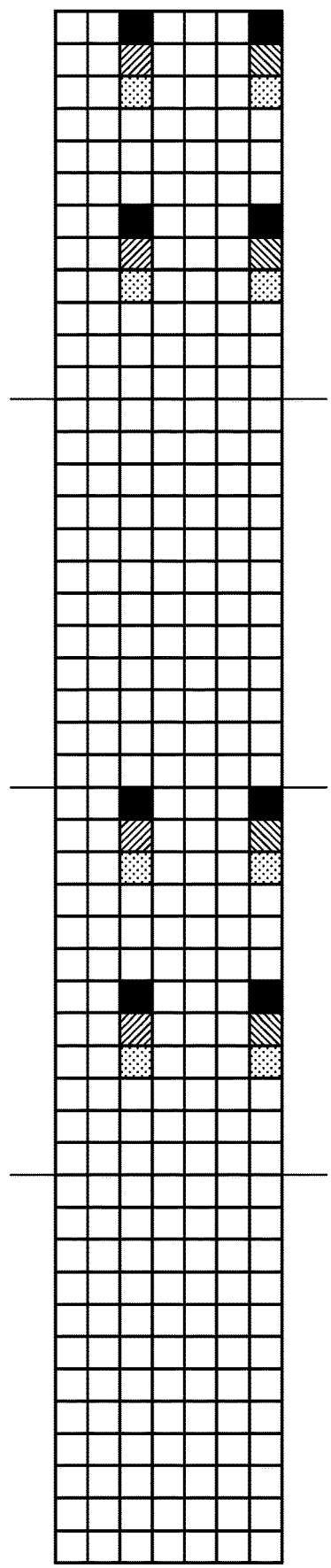
FIG. 10 is a diagram illustrating a fourth example of a DMRS arrangement used in the communication system according to the first embodiment.

Although the present embodiment has described the example in which the number of OFDM symbols containing DMRSs is one per RB, the number of OFDM symbols containing DMRSs per RB may be two or more. For example, as illustrated in FIG. 10, RBs in which DMRSs are placed may contain DMRSs distributed in the time domain. FIG. 10 is a diagram illustrating a fourth example of a DMRS arrangement used in the communication system according to the present embodiment.

Figure 11:
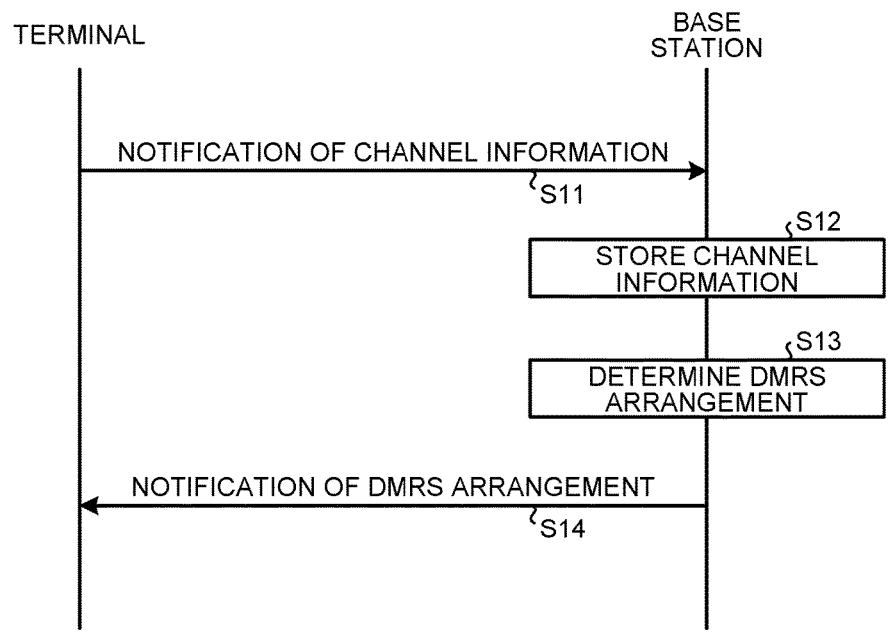
FIG. 11 is a sequence diagram illustrating an example of an operation of the base station according to the first embodiment to determine a DMRS arrangement.

Next, an operation of the base station 1 to determine a DMRS arrangement will be described. FIG. 11 is a sequence diagram illustrating an example of the operation of the base station 1 to determine a DMRS arrangement.

When determining a DMRS arrangement, the base station 1 first receives a notification of channel information representing a channel state in the downlink from the terminal 2 (step S11), and stores the channel information in a storage unit not illustrated in FIG. 2 (step S12). Next, the base station 1 determines a DMRS arrangement on the basis of the channel information indicated from the terminal 2 (step S13). The DMRS arrangement is determined by the information processing unit 121 of the base station 1. For example, when differences in channel state between RBs allocated to the terminal 2 are small, specifically, channel states in a plurality of RBs continuous in the frequency axis direction do not have significant differences, the information processing unit 121 of the base station 1 determines a DMRS arrangement such that the number of RBs in which to place DMRSs is reduced. The DMRS arrangement is selected from among a plurality of predetermined arrangement patterns. In a state where DMRSs are placed in some RBs, for example, a state where DMRSs are placed in every third RB as illustrated in FIG. 9, when the RBs in which the DMRSs are placed are largely different in the channel state, the information processing unit 121 determines a DMRS arrangement such that the number of RBs in which to place DMRSs is increased. In this case, the information processing unit 121 determines to use, for example, the arrangement illustrated in FIG. 6. The plurality of predetermined arrangement patterns may vary from terminal 2 to terminal 2.

Upon determining the DMRS arrangement, the base station 1 notifies the terminal 2 of the DMRS arrangement (step S14). As described above, the notification of the DMRS arrangement may be performed using a parameter directly indicating the positions of RBs in which to transmit DMRSs, or may be performed using a parameter indirectly indicating the positions of RBs in which to transmit DMRSs. The base station 1 notifies the terminal 2 of the DMRS arrangement by the above-described method using Layer 1, Layer 2, or Layer 3.

Figure 12:
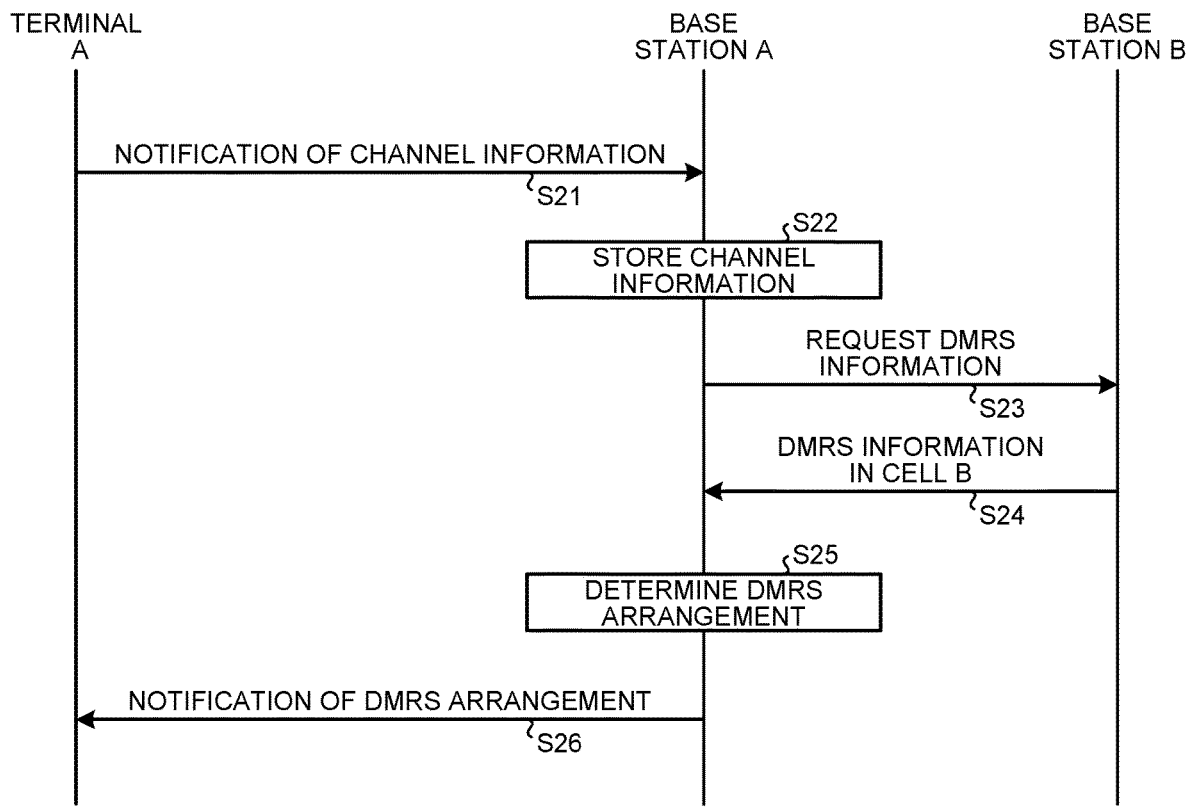
FIG. 12 is a sequence diagram illustrating another example of the operation of the base station according to the first embodiment to determine a DMRS arrangement.

In the sequence illustrated in FIG. 11, the base station 1 determines the DMRS arrangement using the information acquired from the terminal 2. In addition to the information acquired from the terminal 2, the base station 1 may use information acquired from another base station to determine a DMRS arrangement. A sequence in this case is illustrated in FIG. 12. FIG. 12 is a sequence diagram illustrating another example of the operation of the base station 1 to determine a DMRS arrangement. FIG. 12 illustrates a sequence of the operation of the base station A in the communication system illustrated in FIG. 7 to determine a DMRS arrangement on the basis of information acquired from the terminal A and information acquired from the base station B.

When determining a DMRS arrangement according to the sequence illustrated in FIG. 12, the base station A first receives notification of channel information indicating a channel state in the downlink from the terminal A (step S21), and stores the channel information in the storage unit not illustrated in FIG. 2 (step S22). The operation in steps S21 and S22 is the same as the operation in steps S11 and S12 illustrated in FIG. 11.

Next, the base station A requests DMRS information from the base station B (step S23). The DMRS information is information on the arrangement of RBs in which DMRSs are transmitted, and here, is information indicating the arrangement of RBs in which the base station B transmits DMRSs to the terminal B in the cell B. That is, the DMRS information is information on RBs used in the transmission of DMRSs in the adjacent cell B.

The base station B that has received the request for the DMRS information from the base station A transmits the DMRS information to the base station A (step S24). If there are a plurality of terminals in the cell B, the base station B may transmit only DMRS information on a terminal located in a position close to the boundary with the cell A, or may transmit DMRS information on all the terminals located in the cell B. When transmitting only DMRS information on a terminal located in a position close to the boundary with the cell A, the base station B identifies the corresponding terminal on the basis of position information of each terminal, and transmits DMRS information indicating an RB arrangement used in the transmission of DMRSs to the identified terminal. When transmitting DMRS information on all the terminals, the base station B transmits position information on each terminal together with the DMRS information on each terminal.

When the base station A receives the DMRS information from the base station B, the base station A determines a DMRS arrangement, on the basis of the channel information acquired from the terminal A in step S21 and the DMRS information acquired from the base station B (step S25). For example, the base station A determines the number of RBs in which to place DMRSs in the same way as in the processing in step S13 illustrated in FIG. 11, and further, determines the arrangement of RBs in which to transmit DMRSs to the terminal A to avoid coinciding with the DMRS arrangement indicated by the DMRS information acquired from the base station B.

Upon determining the DMRS arrangement, the base station A notifies the terminal A of the DMRS arrangement (step S26). The processing in step S26 is the same as the processing in step S14 illustrated in FIG. 11.

The DMRS information acquired by the base station A in step S24 may contain information on sequences used as DMRSs in the cell B, that is, PN sequences or ZC sequences. When the DMRS information contains information on sequences used as DMRSs, the base station A may generate sequences that do not interfere with the sequences used as DMRSs in the cell B, and use them as DMRSs to be transmitted to the terminal A.

In the operation to determine a DMRS arrangement according to the sequence illustrated in FIG. 12, the base station A determines a DMRS arrangement on the basis of the channel information acquired from the terminal A and the DMRS information acquired from the base station B. The base station A may determine a DMRS arrangement on the basis of only the DMRS information. In this case, the base station A determines a DMRS arrangement such that DMRSs are transmitted to the terminal A using RBs that are not used in the transmission of DMRSs from the base station B to the terminal B. Alternatively, the base station A determines the use of sequences having low correlation with DMRSs that the base station B transmits to the terminal B, as DMRSs. When a DMRS arrangement is determined without using channel information, S21 and S22 illustrated in FIG. 12 may be omitted.

Figure 13:
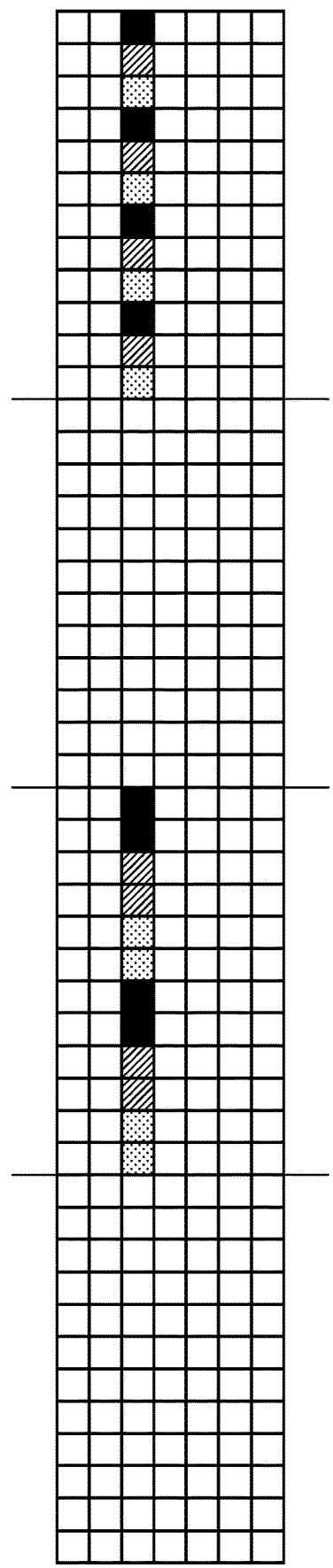
FIG. 13 is a diagram illustrating a fifth example of a DMRS arrangement used in the communication system according to the first embodiment.

Next, variations of DMRS arrangements usable in the communication system according to the present embodiment will be described. Although the present embodiment has described the case where the arrangement pattern of DMRSs in RBs is fixed, the arrangement pattern may not necessarily be fixed. For example, as illustrated in FIG. 13, the DMRS arrangement pattern may be varied from RB to RB. FIG. 13 is a diagram illustrating a fifth example of a DMRS arrangement used in the communication system according to the present embodiment. In the example illustrated in FIG. 13, in the kth RB, a pattern in which four DMRSs are placed at equal intervals, or at every third frequency, is used, and in the k+2nd RB, a pattern in which four DMRSs are divided into groups each having two DMRSs and each group is placed at every fifth frequency is used. The arrangement patterns illustrated in FIG. 13 are an example, and other arrangement patterns may be used. Examples of other arrangement patterns are illustrated in FIG. 14. FIG. 14 is a diagram illustrating examples of arrangement patterns of DMRSs in an RB. As other arrangement patterns, those illustrated in FIG. 15 may be used. FIG. 14 illustrates only arrangement patterns of DMRSs set in one OFDM symbol. As illustrated in FIG. 15, it is not necessary to use all REs in an OFDM symbol in which DMRSs are placed. A pattern may be prepared in which DMRSs are placed in some REs in an OFDM symbol. When PN sequences are used in the middle DMRS example arrangement in the upper row in FIG. 14, they can be multiplexed, using Discrete Fourier Transform (DFT) vectors. For example, let symbols placed in (0, 2), (4, 2), and (8, 2) be $q_0$, $q_1$, and $q_2$. By multiplying the symbols by elements of the DFT vectors, up to three transmission layers can be multiplexed. Let $W_N = e^{j2\pi/N}$. Then, let $W_N^{mk} = e^{j2\pi mk/N}$. In the above-described example, DMRSs corresponding to a first port are $q_0$, $q_1$, and $q_2$. DMRSs corresponding to a second port are $q_0$, $W_3^{-1}*q_1$, and $W_3^{-2}*q_2$. DMRSs corresponding to a third port are $q_0$, $W_3^{-2}*q_1$, and $W_3^{-4}*q_2$. Since the DFT vectors are in an orthogonal relationship, the DMRS symbols of the ports are also orthogonal. In general, when M REs are used, up to M transmission layers are multiplexed. Thus, processing on the kth DMRS symbol of the mth port is $W_M^{-k(m-1)}*q_k$, wherein $0 \leq k \leq M-1$, and $1 \leq m \leq M$.

Figure 16:
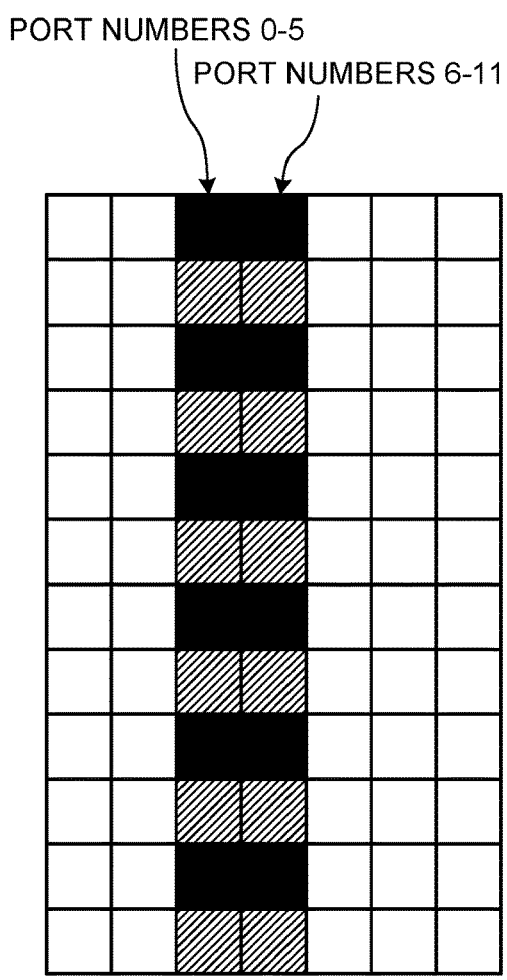
FIG. 16 is a diagram illustrating an example when DMRSs are placed in two OFDM symbols.

Although the number of ports supported in one OFDM symbol containing DMRSs is twelve in the communication system according to the present embodiment, the present invention is not limited to this. The number of ports need not be twelve. Two OFDM symbols may be used to support twelve ports. For example, of two OFDM symbols in which DMRSs are placed, the first OFMD symbol may support port numbers 0 to 5 and the second OFDM symbol may support port numbers 6 to 11. That is, DMRSs corresponding to port numbers 0 to 5 may be placed in the first OFDM symbol, and DMRSs corresponding to port numbers 6 to 11 may be placed in the second OFDM symbol. An example where DMRSs corresponding to port numbers 0 to 11 are placed in two OFDM symbols is illustrated in FIG. 16. In the example illustrated in FIG. 16, DMRSs for port numbers 0 to 5 are placed in the third OFDM symbol and DMRSs for port numbers 6 to 11 are placed in the fourth OFDM symbol. Specifically, DMRSs for port numbers 0 to 2 are placed in REs of black portions of the third OFDM symbol, and DMRSs for port numbers 3 to 5 are placed in REs of hatched portions. DMRSs for port numbers 6 to 8 are placed in REs of black portions of the fourth OFDM symbol, and DMRSs for port numbers 9 to 11 are placed in REs of hatched portions.

When DMRSs are placed in a plurality of OFDM symbols in one slot, the DMRS arrangement pattern may be varied from OFDM symbol to OFDM symbol. In this case, the base station 1 notifies the terminal 2 of arrangement pattern setting information in Layer 1.

Next, precoding processing executed by the precoding unit 13 will be described. The precoding processing uses a precoding matrix. The precoding matrix depends on a downlink channel. Therefore, the base station 1 needs to acquire, from the terminal 2, channel information indicating the results of channel estimation at the terminal 2, and calculate a precoding matrix using the acquired channel information. When a plurality of RBs are allocated to the terminal 2, there is a possibility that the frequency selectivity of the channel in the RBs differs. Thus, the base station 1 calculates different precoding matrices for different RBs. However, when the channel state in frequency does not change over a plurality of RBs, that is, when the frequency selectivity of the channel does not change over a plurality of RBs, a technique called physical RB (PRB) bundling defined in 3GPP can be used. In the PRB bundling, precoding is performed using the same precoding matrix among a plurality of RBs. The number of RBs on which it is expected to use the same precoding in the PRB bundling is called Precoding Resource block Groups (PRGs) in 3GPP.

The control of adaptively changing the arrangement of RBs in which to transmit DMRSs described in the present embodiment can also be performed in a communication system to which the PRB bundling is applied.

In the communication system according to the present embodiment, when the PRB bundling is performed, for example, the information processing unit 121 of the base station 1 is notified that the PRB bundling is ON, that is, the PRB bundling is performed, from an upper layer by an upper layer control signal. When the information processing unit 121 is notified that the PRB bundling is performed, the information processing unit 121 sets the DMRS arrangement to one of a plurality of predetermined arrangements. When the PRB bundling is performed in the communication system according to the present embodiment, for DMRS_RB_DENSITY of the above-described parameters, DMRS_RB_DENSITY=1 can be selected when PRGs is a multiple of two, and DMRS_RB_DENSITY=2 can be selected when PRGs is a multiple of three.

When the PRB bundling is performed, the positions of RBs used in the PRB bundling are also notified to the information processing unit 121 of the base station 1 from an upper layer. For example, when 100 RBs are prepared for the PRB bundling, the positions of the RBs are notified to the information processing unit 121 by numerical values from 0 to 99. The DMRS arrangements according to the present embodiment, specifically, the arrangements illustrated in FIGS. 6, 8, and 9, for example, may be used only when the PRB bundling is not performed. Even when the PRB bundling is not set, the above-described parameters such as DMRS_RB_DENSITY and DMRS_RB_OFFSET are set as described above. There are no restrictions on PRGs. Note that DMRS_RB_DENSITY and DMRS_RB_OFFSET may be notified to the terminal 2 from the base station 1 in an upper layer. DMRS_RB_DENSITY and DMRS_RB_OFFSET may be notified to the terminal 2 in Layer 1 or Layer 2. Only DMRS_RB_DENSITY may be notified to the terminal 2 in an upper layer, and DMRS_RB_OFFSET may be notified to the terminal 2 in Layer 1.

As described above, in the communication system according to the present embodiment, the base station 1 determines RBs in which to transmit DMRSs, on the basis of at least one of channel information indicating the state of a downlink channel to the terminal 2 and DMRS information indicating the arrangement of RBs in which to transmit DMRSs in an adjacent cell. Consequently, the positions of RBs in which to transmit DMRSs and the density of RBs in which to transmit DMRSs can be adaptively changed, preventing reductions in communication quality and transmission efficiency.

Figure 17:
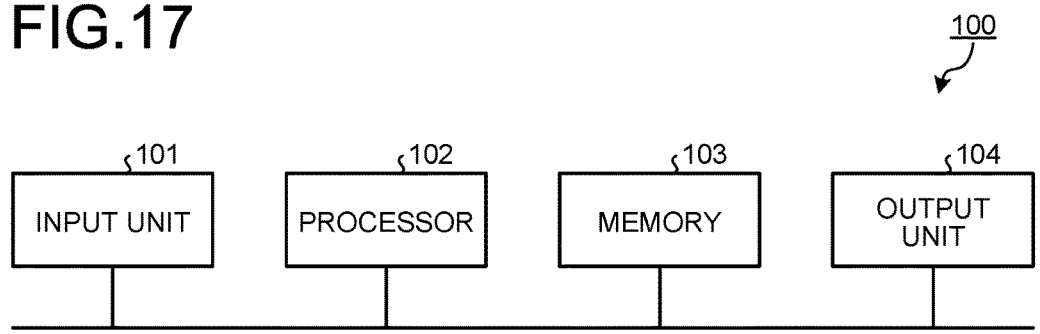
FIG. 17 is a diagram illustrating an example configuration of a control circuit when components of the base station are implemented by software.

Next, the hardware configuration of the base station 1 according to the present embodiment will be described. Of the components of the base station 1 illustrated in FIG. 2, components implemented by software are implemented, for example, by a control circuit illustrated in FIG. 17. FIG. 17 is a diagram illustrating an example configuration of a control circuit 100 used when components of the base station 1 are implemented by software. As illustrated in FIG. 17, the control circuit 100 includes an input unit 101 that is a receiving unit for receiving data input from the outside, a processor 102, a memory 103, and an output unit 104 that is a transmitting unit for transmitting data to the outside. The input unit 101 is an interface circuit that receives data input from the outside of the control circuit 100 and provides it to the processor 102. The output unit 104 is an interface circuit that sends data from the processor 102 or the memory 103 to the outside of the control circuit 100. When at least some of the components illustrated in FIG. 2 are implemented by the control circuit 100 illustrated in FIG. 17, they are implemented by the processor 102 reading and executing programs corresponding to the software-implemented components stored in the memory 103. The memory 103 is also used as a temporary memory in individual processing executed by the processor 102.

The processor 102 is a central processing unit (CPU, also called a central processor, a processing unit, an arithmetic unit, a microprocessor, a microcomputer, a processor, or a digital signal processor (DSP)), or the like. The memory 103 corresponds to a nonvolatile or volatile semiconductor memory such as a random access memory (RAM), a read only memory (ROM), a flash memory, an erasable programmable read only memory (EPROM), or an electrically erasable programmable read only memory (EEPROM), or a magnetic disk, a flexible disk, an optical disk, a compact disk, a mini disk, a digital versatile disk (DVD), or the like.

Figure 18:
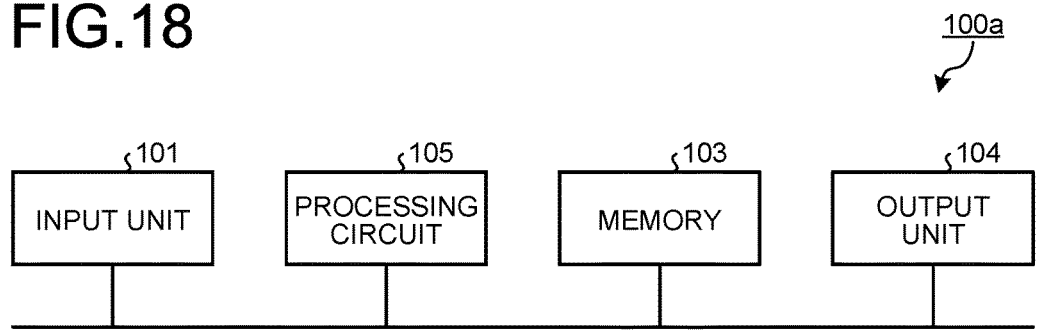
FIG. 18 is a diagram illustrating an example configuration of a dedicated circuit when components of the base station are implemented by dedicated hardware.

Of the components of base station 1, components implemented by dedicated hardware are implemented, for example, by a circuit of a configuration illustrated in FIG. 18. FIG. 18 is a diagram illustrating an example configuration of a dedicated circuit 100a used when components of the base station 1 are implemented by dedicated hardware. As illustrated in FIG. 18, the dedicated circuit 100a is the control circuit 100 illustrated in FIG. 17 in which the processor 102 is replaced by a processing circuit 105. The processing circuit 105 is, for example, a single circuit, a combined circuit, a programmed processor, a parallel-programmed processor, an Application Specific Integrated Circuit (ASIC), a Field Programmable Gate Array (FPGA), or a combination of them.

The terminal 2 can be implemented by similar hardware. Base stations and terminals described in second and subsequent embodiments can be implemented by similar hardware.

Second Embodiment

Figure 19:
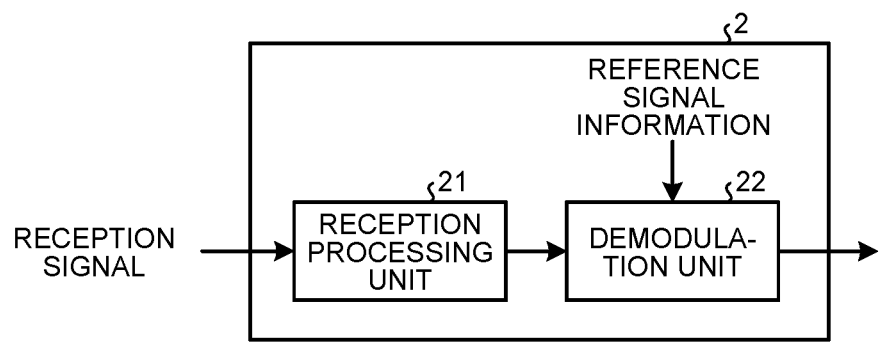
FIG. 19 is a diagram illustrating an example configuration of a terminal according to the present invention.

FIG. 19 is a diagram illustrating an example configuration of a terminal according to a second embodiment. The terminal 2 illustrated in FIG. 19 is one of the terminals 2-1 to 2-n illustrated in FIG. 1, and corresponds to the receiving apparatus for receiving downlink signals transmitted from the base station 1 described in the first embodiment.

The terminal 2 includes a reception processing unit 21 and a demodulation unit 22. The reception processing unit 21 performs processing to remove a CP from a signal received from the base station 1 and perform multipath interference removal, Discrete Fourier Transform (DFT) as frequency domain conversion processing, etc. The demodulation unit 22 performs channel estimation and demodulation processing for each layer. At this time, the demodulation unit 22 performs channel estimation using DMRSs included in a received signal, and demodulates data contained in the received signal using the results of the channel estimation. Reference signal information that is information on RBs in which DMRSs are placed corresponds to the parameters described in the first embodiment, and is notified to the terminal 2 from the base station 1 using Layer 1, Layer 2, or Layer 3. The reference signal information notified to the terminal 2 is finally input to the demodulation unit 22. The demodulation unit 22 identifies the positions of DMRSs contained in the received signal on the basis of the reference signal information. The reference signal information includes information such as a port number(s), an offset value, and the density of DMRSs. Interference removal may be performed in the reception processing unit 21. When performing interference removal, the reception processing unit 21 removes interference using a method such as an Interference Rejection Combining (IRC) method.

Thus, the terminal 2 according to the present embodiment performs channel estimation and data signal demodulation, using DMRSs contained in a downlink signal transmitted by the base station 1 according to the first embodiment.

Third Embodiment

The first embodiment has disclosed the method of setting DMRSs for each terminal to solve the above-mentioned problem. The present embodiment discloses another method. The configuration of a communication system and the configuration of a base station are the same as those in the first embodiment.

In the communication system according to the present embodiment, the arrangement of RBs containing DMRSs is set for each cell. For example, a cell-specific inter-RB DMRS arrangement is set to the comb-like arrangement described in the first embodiment. To simplify the explanation, it is assumed that one base station forms one cell for explanation.

An example of setting RBs in which to place DMRSs for each cell is described with reference to FIG. 6. In FIG. 6, DMRSs are arranged in a comb shape in RB units. In the communication system according to the present embodiment, resources, that is, RBs and REs in which to place DMRSs are preset for each cell. This enables the provision of resources in which no DMRSs are placed for each cell. Resources in which no DMRSs are placed can be used for other signals or other channels, thus enabling an improvement in frequency utilization efficiency.

Hereinafter, a method of setting a DMRS arrangement for each cell will be described. First, information used to set a DMRS arrangement in the communication system according to the present embodiment will be described. As the information used to set a DMRS arrangement, four examples (1-1) to (1-4) described below can be given.

(1-1) The numbers of RBs in which to place DMRSs (RB numbers)
(1-2) The head number of RBs in which to place DMRSs
(1-3) The density (d) of RBs in which to place DMRSs
(1-4) A combination of (1-1) to (1-3)

As for (1-2), an offset may be used instead of the head number of RBs. An offset may be set in a field like CELL DMRS_RB_OFFSET. For example, letting CELL DMRS_RB_OFFSET={0, 1}, when CELL DMRS_RB_OFFSET=0, an offset may be set to 0 that is the smallest RB number, and when CELL DMRS_RB_OFFSET=1, an offset may be set to 1 that is the next RB number.

As for (1-3), d may be set in a field like CELL DMRS_RB_DENSITY. For example, letting CELL DMRS_RB_DENSITY={0, 1, 2}, when CELL DMRS_RB_DENSITY=0, DMRSs may not necessarily be set in a comb shape, when CELL DMRS_RB_DENSITY=1, DMRSs may be set in every second symbol, and when CELL DMRS_RB_DENSITY=2, DMRSs may be set in every third symbol.

In the communication system according to the present embodiment, for example, by setting "RB numbers in which to place DMRSs" in the above (1-1) for each cell, the RB numbers in which to provide DMRSs are specified. As another example, by setting "the head number of RBs in which to place DMRSs" in the above (1-2) and "the density of RBs in which to place DMRSs" in the above (1-3) for each cell, the RB numbers which contain DMRSs are specified.

Instead of placing DMRSs in the same pattern in the entire band of the cell, RBs in which to place DMRSs may be set in a specific band. A plurality of sets of specific bands may be provided. Examples of using a specific band include an example where different services are provided at different bands.

As information for setting a specific band, four examples (2-1) to (2-4) described below can be given.

(2-1) The number of an RB at which to start a specific band
(2-2) The number of an RB at which to end a specific band
(2-3) The number of RBs in a specific band
(2-4) The number of specific bands Note that (2-4) may be the number of sets of specific bands. Setting in a specific band can be set using the above-described information for setting a DMRS arrangement. This allows different DMRS arrangements in the entire band of a cell, instead of the same DMRS arrangement. Consequently, for example, when different frequency bands are used for different services, different DMRS arrangements can be set for different services.

In the communication system according to the present embodiment, a cell-specific inter-RB DMRS arrangement is fixed.

A cell-specific inter-RB DMRS arrangement may be statically determined in advance according to a standard or the like. For example, according to a standard or the like, the identifier of a cell, information for setting a DMRS arrangement, and information for setting a specific band are determined in advance in association with one another. This can make an inter-RB DMRS arrangement in a comb shape, and allows an improvement in frequency utilization efficiency.

By this pre-determination, when a terminal recognizes the identifier of a cell, the terminal can derive a cell-specific inter-RB DMRS arrangement of the cell. As a method for a terminal to recognize the identifier of a cell, the terminal may receive a signal or a channel associated with the identifier of the cell to derive it. For example, the terminal may receive a Synchronization Signal (SS) used in 3GPP for derivation. This allows the terminal to recognize a cell-specific inter-RB DMRS arrangement. The terminal can use the DMRSs at the time of data demodulation.

Although RBs in which to place DMRSs are set for each cell, they may be set the same for all cells. One or more cells may be grouped, and RBs in which to place DMRSs may be varied from group to group. As another example, RBs in which to place DMRSs may be varied from cell to cell in a group, and they may be set the same or uncorrelated between groups. By enabling such flexible setting, a per-RB DMRS arrangement can be set appropriately for cell coverage, a frequency band, a supported service, or the like. Moreover, the system frequency utilization efficiency can be improved.

It has been described that a cell-specific inter-RB DMRS arrangement is determined in advance statically according to a standard or the like. As another method, an inter-RB DMRS arrangement may be notified to terminals from a base station in a cell to which the present embodiment is applied. An example of a method of notification from the base station to the terminals is described below.

The base station broadcasts inter-RB DMRS arrangement information of its own cell to terminals under its control. As the inter-RB DMRS arrangement information, the base station broadcasts information such as information for setting a DMRS arrangement and information for setting a specific band described above to the terminals.

Alternatively, a plurality of patterns of inter-RB DMRS arrangements may be prepared according to a standard or the like, and an index may be provided to each pattern. In this case, the base station broadcasts index information to the terminals. The base station may broadcast index information as the inter-RB DMRS arrangement information.

The terminals under the cell can recognize the inter-RB DMRS arrangement of the cell by receiving the information broadcasted from the base station.

The base station may include the above information to be broadcasted to the terminals in a Master Information Block (MIB) as broadcast information. Alternatively, the base station may include the above pieces of information to be broadcasted to the terminals in minimum System Information (SI) being discussed in 3GPP. The base station may notify the above pieces of information to be broadcasted to the terminals by the Physical Broadcast Channel (PBCH). The base station may include the above pieces of information to be broadcasted to the terminals in a System Information Block (SIB) to broadcast them.

Another notification method will be described. The base station notifies the terminals under its control of the inter-RB DMRS arrangement information of its own cell by individual signaling. That is, the base station does not broadcast the arrangement information to the terminals, but notifies the arrangement information to the terminals by terminal-specific signaling. The base station may include the inter-RB DMRS arrangement information in terminal-specific information to notify it to the terminals. Thus, terminal-specific necessary information can be individually notified to the terminals. For example, when the inter-RB DMRS arrangement varies from service to service, an inter-RB DMRS arrangement for a service to be supported can be notified to each terminal.

The base station may include the inter-RB DMRS arrangement information in information common to cells to notify it to the terminals. In this case, control becomes less complex. The base station may include the inter-RB DMRS arrangement information in terminal-specific SIB information to notify it to the terminals. The base station may notify the inter-RB DMRS arrangement information as, for example, other SI information proposed in 3GPP to the terminals.

The cell-specific inter-RB DMRS arrangement may be changeable. In this case, a base station of a cell of which the DMRS arrangement has been changed notifies terminals of correction information on the inter-RB DMRS arrangement of the cell. The base station of the cell of which the DMRS arrangement has been changed may notify the terminals of information on a newly set inter-RB DMRS arrangement as the DMRS arrangement correction information.

As a method of notifying the terminals of the correction information from the base station, a method of changing system information in Long Term Evolution (LTE) may be used. As another method, the base station may notify the terminals of the correction information by terminal-specific signaling. For example, the correction information on the inter-RB DMRS arrangement may be included in an RRC connection reconfiguration message to notify it to the terminals.

Alternatively, information indicating that the inter-RB DMRS arrangement information has been corrected may be included in an RRC connection reconfiguration message to notify it to the terminals. In this case, a terminal that has received the information indicating that the arrangement information has been corrected receives a channel on which the changed information, that is, the correction information on the inter-RB DMRS arrangement of the cell is notified to the terminal, thereby receiving the notification of the correction information.

Alternatively, a terminal that has received the information indicating that the arrangement information has been corrected may transmit signaling to request transmission of changed system information to the base station of the cell for which the arrangement information has been corrected. Alternatively, a terminal that has received the information indicating that the arrangement information has been corrected may transmit signaling to request transmission of the correction information on the inter-RB DMRS arrangement to the base station of the cell for which the arrangement information has been corrected. When the base station of the cell for which the arrangement information has been corrected receives information requesting the transmission of the correction information from the terminal, it notifies the terminal of the changed system information or the correction information on the inter-RB DMRS arrangement.

This allows the cell-specific inter-RB DMRS arrangement to be changed appropriately. Also, this allows the base station to notify the terminals of the changed inter-RB DMRS arrangement. Thus, the inter-RB DMRS arrangement can be changed according to the radio wave propagation environment, load status, and the like of the cell.

The above has disclosed the pre-determination of information for setting an inter-RB DMRS arrangement for each cell. As another method, information for setting an inter-RB DMRS arrangement may be derived using a cell-specific identifier. In this case, a function including a cell ID that is the identifier of a cell in input parameters may be provided to derive the information using the function.

For example, the density (d) of RBs in which to place DMRSs is determined in advance. Letting the identifier of a cell be N_cell_ID, an RB number n in which to place DMRSs is derived from the following formula (3).

In formula (3), m is an integer of zero or more and n is zero to the number of RBs in the entire band of the cell−1. For example, the value of d is determined in advance according to a standard or the like.

$$n = (N\_cell\_ID \bmod d) + m \times d \qquad (3)$$

This method is also applicable to the case where RBs in which to place DMRSs are set in a specific band. The value of d may vary from specific band to specific band.

This enables the derivation of RB numbers in which to place DMRSs from the identifier of a cell. In this case, information for setting a DMRS arrangement need not be determined in advance for each cell, and can be derived from the identifier of a cell. A terminal can acquire the identifier of a cell by the above-described method. Thus, the amount of information to be transmitted from the base station to the terminal can be reduced, compared to the case where the DMRS arrangement is notified to the terminal from the base station.

As described above, by providing in advance a function including the identifier of a cell in input parameters and deriving information on an inter-RB DMRS arrangement using the function, different inter-RB DMRS arrangements can be set for different cells. By assigning appropriate cell identifiers among neighboring cells, interference received by a terminal from another cell can be reduced. That is, reception quality at the terminal can be improved.

Although it has been disclosed that the density (d) of RBs in which to place DMRSs is determined in advance according to a standard or the like, the value of d may be notified to a terminal from a base station. A method of the notification may be the same method as the above-described method of notifying the terminal of the inter-RB DMRS arrangement information and the correction information on the inter-RB DMRS arrangement from the base station.

This allows RBs in which to place DMRSs to be changed according to the radio wave propagation environment, load status, or the like of the cell.

As for a method of placing DMRSs in an RB, the method disclosed in the first embodiment is used. A method used in LTE may be used. Alternatively, a method proposed in 3GPP may be used. As another method, REs in which to place DMRSs in an RB may be derived using a function with an RB number as an input parameter. A plurality of patterns of REs in which to place DMRSs may each be represented by an index, and the index may be derived by a function.

As illustrated in the first embodiment, DMRSs may not necessarily be placed in all REs on one OFDM symbol. The number of multiplexed DMRSs in one RB may be reduced so that data or the like can be placed in REs in which no DMRSs are placed. In this case, by adjusting the above-described value d, the setting of the number of DMRSs to be multiplexed in one RB may be appropriately changed.

A base station of a cell to which the present embodiment is applied notifies a terminal of information on DMRS ports to be used. The information includes DMRS port numbers. There is a parameter for deriving a DMRS sequence. The parameter is, for example, a scrambling identifier.

The base station of the cell to which the present embodiment is applied may include the information on the DMRS ports to be used and the above parameter in the downlink control information (DCI) to notify the terminal of them. The base station may notify the terminal of the above information and parameter, using a Layer 1 (L1) control channel or a Layer 2 (L2) control channel. The base station may notify the terminal of the above information and parameter through the PDCCH. By receiving the information, the terminal can acquire the information on the DMRS ports to be used for demodulation.

When the above information and parameter are included in the DCI and notified to the terminal, the DMRS ports to be used can be changed at each scheduling timing. Consequently, in such a case where multiplexing on a plurality of terminals is performed, flexible scheduling is possible and frequency utilization efficiency can be improved.

The inter-RB DMRS arrangement set for each cell disclosed in the present embodiment may be enabled when the number of RBs located in the time axis direction is equal to or more than a predetermined number. Alternatively, it may be disabled when the number of RBs located in the time axis direction is equal to or less than a predetermined number. For example, the range of the number of RBs may be associated with a possible value of d in that range. As an example, when the number of RBs is fifty or less, d≤2, and when the number of RBs is fifty or more, d≤3. These may be determined in advance according to a standard or the like.

This allows the number of RBs in which to place DMRSs to be reduced when the number of RBs is small, enabling scheduling of data for a large number of terminals under control. Moreover, frequency utilization efficiency can be improved.

Fourth Embodiment

The first embodiment has described the case where the inter-RB DMRS arrangement is changed in the frequency axis direction. Next, an embodiment in which the arrangement is changed in the time axis direction will be described. The configuration of a communication system and the configuration of a base station are the same as those in the first embodiment.

In the present embodiment, in which the arrangement of RBs containing DMRSs is changed in the time axis direction, a function is provided in advance which includes, in input parameters, a scheduling unit in the time axis direction such as a slot number, a subframe number, a radio frame number, or a system frame number, and RBs in which to place DMRSs are derived, using the function. As a value for deriving RBs in which to place DMRSs, information for setting a DMRS arrangement described at the beginning of the third embodiment, specifically, the above-described information (1-1) to (1-4) and (2-1) to (2-4) can be used.

For example, the density (d) of RBs in which to place DMRSs is determined in advance. Letting a radio frame number be RFN, an RB number n RFN in which to place DMRSs in the RFN is derived from the following formula (4). In formula (4), m is an integer of zero or more and n RFN is zero to the number of RBs in the entire band of the cell−1. For example, the value of d is determined in advance according to a standard or the like.

$$n\_RFN = (RFN \bmod d) + m \times d \quad (4)$$

The terminal can derive RBs in which to place DMRSs set for the cell from the RFN of scheduled resources. This allows RBs in which to place DMRSs to be varied in the time axis direction.

In a radio wave propagation environment in which the reception quality of particular RBs is degraded continuously in time, the form of changing the DMRS arrangement in the time axis direction can prevent degradation of the reception error rate caused by the impossibility of demodulation for a long period of time.

The method of setting RBs in which to place DMRSs for each cell disclosed in the third embodiment may be used together. In this case, a function including a cell-specific identifier in input parameters may be provided in advance, and RBs in which to place DMRSs may be derived, using the function. This allows cell-specific RBs in which to place DMRSs to be varied in the time axis direction.

Although the method has been described in which the terminal determines RBs in which to place DMRSs using the function, the base station that sets RBs in which to place DMRSs may dynamically notify the terminal of RBs in which to place DMRS. At this time, the base station may notify the terminal of RBs in which to place DMRSs in a scheduling unit in the time axis direction. The base station may notify the terminal of information for deriving RBs in which to place DMRSs instead of RBs in which to place DMRSs themselves. As the information, the information for setting a DMRS arrangement and the information for setting a specific band disclosed in the first embodiment may be used.

A base station of a cell to which the present embodiment is applied includes information for determining RBs in which to place DMRSs in the DCI to notify it to the terminal. The base station may notify the terminal of the DCI including the information using a Layer 1 (L1) control channel or a Layer 2 (L2) control channel. The base station may notify the terminal of the information through the PDCCH.

The base station may include information for determining RBs in which to place DMRSs in a DCI for common information to notify the terminal of it. It is preferable that the base station can specify the DCI for common information using a predetermined Radio Network Temporary Identifier (RNTI). This enables the terminal to receive and demodulate the common information through the predetermined RNTI. The predetermined RNTI may be determined in advance according to a standard or the like, or may be notified from the base station to the terminal by RRC signaling. By notifying the terminal of the information as common information, the amount of information notified from the base station to the terminal can be reduced.

The base station may include the information for determining RBs in which to place DMRSs in a DCI for terminal-specific information to notify the terminal of it. The base station may include the information in the DCI together with scheduling information to the terminal to notify the terminal of it. In this case, the terminal can receive the information in scheduling units. The base station can vary RBs in which to place DMRSs in scheduling units.

As information for determining RBs in which to place DMRSs on the time axis, information indicating a period during which the same setting continues may be provided. In this case, the information is preferably in scheduling units in the time axis direction. The terminal that has received the information determines that the same setting has been made for the period in the information, and receives DMRSs to demodulate data.

Thus, the base station does not have to notify the terminal of the information for determining RBs in which to place DMRSs for a period during which the same setting continues. Consequently, the amount of information to be notified to the terminal can be reduced.

The base station may notify the terminal of the information for determining RBs in which to place DMRSs by RRC signaling. The base station may notify the terminal of, as the information for determining RBs in which to place DMRSs, information on timings to start and end the indicated inter-RB DMRS arrangement setting. The base station may notify the terminal of the information on a timing to start the indicated inter-RB DMRS arrangement setting and a period during which the setting is continued. As a unit indicating a timing, a scheduling unit in the time axis direction such as a slot number, a subframe number, a radio frame number, or a system frame number can be used.

As a method of notifying the terminal of RBs in which to place DMRSs, the base station may use a method of notifying the terminal of information for determining RBs in which to place DMRSs. That is, the base station may notify the terminal of information for the terminal to derive RBs in which DMRSs are placed, instead of notifying the terminal of RBs in which to place DMRSs themselves. Here, notification by RRC signaling usually requires a plurality of subframes. By notifying a setting start timing or the like from the base station to the terminal, the base station and the terminal can recognize the timing to set or change DMRSs in common.

This allows the terminal to accurately use DMRSs set by the base station and to demodulate data using the DMRSs.

Although the example of using RRC signaling for the notification from the base station of the cell to the terminal has been disclosed, MAC signaling may be used for the notification. The base station may include the information for determining RBs in which to place DMRSs in a MAC CE to notify the terminal of it. In this case, the notification can be earlier than in the case of using RRC signaling. That is, delays at the time of setting and at the time of change can be reduced.

Although the use of the L1 control channel, the L2 control channel, the MAC CE, or the RRC signaling for the notification of the information for determining RBs in which to place DMRS on each cell has been disclosed, they may be used in combination. For example, part of the information for determining RBs in which to place DMRSs on each cell is notified to the terminal on the L1 control channel and the L2 control channel, and the remainder is notified to the terminal by the RRC signaling.

For example, those changed in scheduling time units are notified to the terminal on the L1 control channel and the L2 control channel, and those that need not be changed for a long period of time are notified to the terminal by the RRC signaling. This enables a notification method according to information.

Fifth Embodiment

As disclosed in the first embodiment, when REs in which DMRSs are placed are the same in the adjacent cells, a terminal may be interfered by a signal from the adjacent cell, resulting in reduced reception quality. The present embodiment describes a method for solving such a problem of causing inter-cell interference.

A communication system according to the present embodiment solves the problem of causing inter-cell interference by coordination between base stations in setting the arrangement of DMRSs in RBs in which to place DMRSs.

Specifically, base stations caused to coordinate are synchronized in DMRS transmission timing. That is, cells of the base stations are synchronized. It is preferable that the base stations synchronize numbers assigned in scheduling units such as subframes and radio frames on the time axis. This facilitates coordinated control.

In this method, a base station notifies an adjacent base station of information for determining RBs in which to place DMRSs of its own cell. The information for determining RBs in which to place DMRSs corresponds to the information used for setting RBs in which to place DMRSs for each cell in the third and fourth embodiments, such as information for setting a DMRS arrangement and information for setting a specific band.

As the information for determining RBs in which to place DMRSs, information on timings to start and end an inter-RB DMRS arrangement setting may be used. Alternatively, information on a timing to start an inter-RB DMRS arrangement setting and a period during which the setting is continued may be used. As a unit indicating a timing, a scheduling unit in the time axis direction such as a slot number, a subframe number, a radio frame number, or a system frame number can be used.

As a unit indicating timing information, a scheduling unit in the time axis direction such as a slot number, a subframe number, a radio frame number, or a system frame number can be used.

As a method of notifying the adjacent base station of RBs in which to place DMRSs, the base station may use a method of notifying the adjacent base station of information for determining RBs in which to place DMRSs. That is, the base station may notify the adjacent base station of information for the adjacent base station to derive RBs in which DMRSs are placed, instead of notifying the adjacent base station of RBs in which to place DMRSs themselves.

The base station may notify the adjacent base station of the information for determining RBs in which to place DMRSs in association with the cell identifier. As the cell identifier, a PCI, an E-UTRAN Cell Global ID (ECGI), or the like may be used. The cell identifier may be an identifier managed on a Radio Access Network (RAN), or may be an identifier managed on a Core Network (CN). By notifying the adjacent base station of the information for determining RBs in which to place DMRSs in association with the cell identifier, a different base station can recognize what cell of what base station it is.

When the base station changes the setting of RBs in which to place DMRSs, the base station notifies the adjacent base station of the changed setting of RBs in which to place DMRSs. Information notified to the adjacent base station by the base station that has changed the setting is the information for determining RBs in which to place DMRSs of its own cell, which is described above.

For information notification between the base stations, signaling of an interface between the base stations is preferably used. A message may be newly provided for notifying the adjacent base station of the information for determining RBs in which to place DMRSs for each cell. The information may be associated with a cell identifier and notified to the adjacent base station by the message. An example of the interface between base stations is the X2 interface defined in LTE. Another example is the Xn interface of New Radio (NR) being discussed as a fifth-generation communication standard in 3GPP.

The base station may notify the adjacent base station of the information for determining RBs in which to place DMRSs in a message for setting up an interface between the base stations. In this case, the base station associates the information for determining RBs in which to place DMRSs of its own cell with the cell identifier, and includes it in the setup message to notify it to neighboring base stations. The neighboring base stations that have received the information each associate information for determining cell-specific RBs in which to place DMRSs of its own cell with the cell identifier, include it in a setup response message, and transmit it as a setup response to the base station that has transmitted the setup message.

The base station may notify the adjacent base station of the information for determining RBs in which to place DMRSs in a message for updating the base station configuration. In this case, the base station associates the information for determining RBs in which to place DMRSs of its own cell with the cell identifier, and includes it in a message for updating the base station configuration to notify it to neighboring base stations.

Both a setup message and an update message may be used for different purposes. For example, the base station may notify an initial setting, that is, information for determining RBs in which to place DMRSs in the initial state to the adjacent base station in a setup message, and notify a changed setting to the adjacent base station in an update message. Thus, an update message can be notified to the adjacent base station only when the base station has changed the setting of RBs in which to place DMRSs of its own cell.

This allows the base station to receive information for determining RBs in which to place DMRSs in the cells of the neighboring base stations, and recognize RBs in which to place DMRSs in the cells of the neighboring base stations. The base station which has recognized RBs in which DMRSs are placed in the cells of the neighboring base stations changes the setting of RBs in which to place DMRSs of its own cell as necessary, by taking the DMRS arrangements in the cells of the neighboring base stations into consideration. Thus, when interference from an adjacent cell becomes a problem at a terminal in its own cell, the base station changes the setting of RBs in which to place DMRSs to allow the terminal to avoid interference and improve reception quality.

The base station may request the neighboring base stations to change the setting of RBs in which to place DMRSs. This request is made using signaling of the interface between the base stations. A message for requesting a change of the setting of RBs in which to place DMRSs (hereinafter, referred to as an arrangement setting change request message) may be newly provided to make a setting change request using this. In this case, the base station that requests a neighboring base station to change the setting includes the cell identifier that is requested to change the setting of RBs in which to place DMRSs, in an arrangement setting change request message to transmit it.

When transmitting the arrangement setting change request message, the base station that requests the neighboring base station to change the setting may include the information for determining RBs in which to place DMRSs of its own cell in the arrangement setting change request message. The information may be associated with the cell identifier of its own cell to be included in the arrangement setting change request message. This allows the base station that has received the arrangement setting change request message to recognize the DMRS arrangement in the cell of the base station that has transmitted the arrangement setting change request message, that is, the RBs in which to place DMRSs. Consequently, the base station that has received the arrangement setting change request message can change the setting of RBs in which to place DMRSs of its own cell by taking the DMRS arrangement in the base station that has transmitted the message into consideration.

The base station that has received the arrangement setting change request message changes the setting if it can meet the request, and transmits a response message to the base station that has made the request. The base station that has received the arrangement setting change request message transmits a response message also when it cannot meet the request. Information included in the response message can be exemplified by (A) to (C) described below.

(A) Information indicating acceptance or rejection (B) When accepting, information for determining changed RBs in which to place DMRSs (C) When refusing, information indicating the reason for rejection This allows the base stations to coordinate to set RBs in which to place DMRSs. As a result, it is possible to reduce the degradation of reception quality at a terminal caused by an interference signal from the adjacent cell.

Coordination among base stations may be performed by another node or entity. For example, a centralized node is provided, and the centralized node performs coordination among base stations connected to the centralized node. Alternatively, a node located in the core network may perform coordination among base stations connected to the core network. For example, a node performing mobility management may control base stations to perform coordination among the base stations. Alternatively, an Operating & Maintenance (OAM) may perform coordination among base stations connected to the OAM.

As a method of coordination, the above-described method may be used as appropriate. For example, a base station notifies a node for performing coordination of information for determining RBs in which to place DMRSs of its own cell (hereinafter referred to as arrangement determination information) in association with the cell identifier. When the node for performing coordination receives the arrangement determination information and cell identification information associated with it from the base station connected to the node, the node resets the DMRS arrangements in the cells of base stations connected to the node, and notifies the base stations of information for determining the reset DMRS arrangements in the cells in association with the cell identifiers. This enables coordinated setting among the base stations.

As another method of coordination, a base station notifies a node for performing coordination of a request for changing the setting of RBs in which to place DMRSs in association with the identifier of a cell to which the change request is made. At this time, the base station may also notify the node of the setting of RBs in which to place DMRSs in its own cell. The base station may notify the node of identification information on its own cell and the setting of RBs in which to place DMRSs in its own cell, together with the change request. When the node for performing coordination receives the request for changing the setting of RBs in which to place DMRSs, the node resets the DMRS arrangement in the cell of the base station that has transmitted the change request and the DMRS arrangement in the cell of the base station to which the request is made, and notifies each base station of information for determining the reset DMRS arrangement in association with the cell identifier. This also enables coordinated setting among the base stations.

This allows the base stations to coordinate to set RBs in which to place DMRSs. As a result, it is possible to prevent the degradation of reception quality at a terminal caused by an interference signal from an adjacent cell. Further, by providing another node or entity with the function of coordination among base stations, coordination control can be easily implemented even when coordination is performed among a large number of base stations.

In the third and fourth embodiments, the base station notifies the terminal of information for determining RBs in which to place DMRSs of its own cell, which is an example. The base station may notify the terminal of information for determining RBs in which to place DMRSs of another cell. For example, the base station may notify the terminal of information for determining RBs in which to place DMRSs of a Secondary Cell (SCell), using a Primary Cell (PCell). Alternatively, the base station may notify the terminal of information for determining cell-specific RBs in which to place DMRSs of a Secondary Cell Group (SCG), using a Master Cell Group (MCG). The base station may notify the terminal of information for determining cell-specific RBs in which to place DMRSs of a MCG, using a PCell.

Alternatively, the base station may notify the terminal of information for determining RBs in which to place DMRSs in a cell for measurement. For example, the base station may notify the terminal of the information using a serving cell. The terminal may perform the measurement of the cell using the information.

This allows signaling for notifying information for determining cell-specific RBs in which to place DMRSs to be easily implemented when a terminal communicates with a plurality of cells or performs measurement, and also allows the information to be transmitted with low delay.

The first embodiment has disclosed that the number of symbols containing DMRSs per RB may be two or more. It may be set for each cell that the number of symbols containing DMRSs per RB be two or more.

In 3GPP, a self-contained slot is being considered. A self-contained slot is a slot in which a downlink signal or channel and an uplink signal or channel are mapped to the same slot. An uplink signal or channel is mapped to one or more symbols from the last symbol of the slot. A gap may be provided between a downlink symbol and an uplink symbol.

Symbols for the uplink and the gap need not be fixed. In this case, if the number of symbols containing DMRSs per RB is two or more, a symbol in which DMRSs are placed may coincide with a symbol used for the uplink or the gap. In this case, there arises a problem in that demodulation at the terminal cannot be performed normally. A method for solving this problem will be disclosed.

When a symbol in which to place DMRSs coincides with a symbol used for the uplink or the gap, no DMRS are placed therein. In other words, the coinciding symbols are used for the uplink or the gap.

For example, assume that one slot consists of seven symbols, DMRSs are placed in the third symbol, and additional DMRSs are placed in the sixth symbol. If a slot of this configuration is set as a self-contained slot in which two symbols from the last symbol are used for the uplink or the gap, the DMRSs coincide with the uplink or the gap at the sixth symbol of the slot.

In this case, the sixth symbol is used for the uplink or the gap to constitute a self-contained slot.

The base station notifies the terminal of the configuration of the self-contained slot. That is, the base station notifies the terminal of information that allows the identification of a symbol number used for the uplink or the gap. For example, the base station notifies the terminal of information indicating that a slot is set as a self-contained slot and information such as the number of symbols or symbol numbers used for the uplink and the gap.

When the terminal that has received information on the configuration of the self-contained slot from the base station recognizes that a symbol in which DMRSs are placed set in the self-contained slot is used for the uplink or the gap, the terminal recognizes that the symbol does not contain DMRSs and is used for the uplink or the gap. This allows the terminal to normally receive and demodulate data of other downlink symbols.

As another method, in a self-contained slot, DMRSs may be placed in advance such that they do not coincide with a symbol used for the uplink or the gap. DMRSs may be placed in advance in an available symbol other than a symbol for the uplink or the gap. The last symbol number in which to place DMRSs is preferably preset to be smaller than a symbol number used for the uplink or the gap.

As another method, in a self-contained slot, DMRSs may be placed in a symbol ahead of a symbol used for the uplink or the gap by a predetermined symbol number n (n=1, 2, 3 . . . ). For example, two DMRS symbols are arranged in a self-contained slot, the first DMRS symbol is fixed, and the second DMRS symbol is placed at a symbol ahead of a symbol used for the uplink or the gap by a predetermined symbol number n (n=1, 2, 3 . . . ).

In this case, a minimum value between the first DMRS symbol and the second DMRS symbol may be determined in advance. If the minimum value of symbols cannot be obtained between the first DMRS symbol and the subsequent DMRS symbol due to the number of symbols used for the uplink and the gap set in the self-contained slot, the subsequent DMRSs may not necessarily be placed.

Such a method may be determined in advance according to a standard or may be notified from the base station to the terminal. Information necessary for such a method may be determined in advance according to a standard or may be notified from the base station to the terminal. As a method of notifying the information from the base station to the terminal, the information may be broadcasted as system information or individually notified to the terminal. Alternatively, the information may be notified to the terminal individually as terminal-specific information.

The notification may be performed using RRC signaling, MAC signaling, an L1 control channel, or an L2 control channel. These may be selectively used for notification depending on the information.

Using such a method can prevent a symbol in which DMRSs are placed from coinciding with a symbol used for the uplink or the gap, allowing the terminal to perform demodulation normally. Reception quality at the terminal can be thus improved.

The configuration disclosed in the first embodiment may be combined with the configuration disclosed in the third embodiment. Specifically, a cell-specific inter-RB DMRS arrangement is determined by the method disclosed in the third embodiment, and the terminal-specific setting of inter-RB DMRSs disclosed in the first embodiment is performed, using the determined arrangement, that is, the cell-specific inter-RB DMRS arrangement. This enables various settings of inter-RB DMRSs, and enables the setting of inter-RB DMRSs suitable for the position of the cell, the radio wave propagation environment of the cell, the load of the cell, the number of terminals to be multiplexed, etc. As a result, frequency utilization efficiency can be improved to increase the system communication capacity.

Sixth Embodiment

The first embodiment and the third to fifth embodiments have disclosed the method of setting DMRSs in unicast communication. In contrast, the present embodiment discloses an example in communication other than unicast communication. The configuration of a communication system and the configuration of a base station are the same as those in the first embodiment.

Also in the communication system according to the present embodiment, the base station arranges an inter-RB DMRS arrangement in a comb shape in a multicast communication. Multicast is a communication scheme for distributing information to a plurality of selected terminals. Broadcast is a communication scheme for all terminals in a cell, and unicast is for a selected terminal.

As the multicast communication, Single Cell-Point To Multipoint (SC-PTM) may be used. As in the third embodiment and others, the arrangement of RBs containing DMRSs may be set for each cell. This allows resources, that is, REs of RBs in which no DMRSs are placed to be used for other signals or other channels, thus enabling an improvement in frequency utilization efficiency. Moreover, this can prevent interference with a DMRS signal from another cell.

A DMRS sequence in a multicast communication may be generated using an identifier that uniquely identifies the multicast communication (hereinafter, sometimes referred to as a multicast ID). For example, the parameter of the ZC sequence described in the first embodiment may be generated using the multicast ID. Alternatively, a PN code may be used as a DMRS sequence, and initial value generation of the PN code may be performed using the multicast ID. This makes it possible to prevent DMRS interference between DMRSs in the multicast communication and those in the other communications, and allows a plurality of terminals to simultaneously receive streams in the multicast communication. The other communications described above include both the other multicast communications and unicast communication.

Here, as information for setting a DMRS arrangement, the information in (1-1) to (1-4) illustrated in the third embodiment may be used. In this case, information common to unicast communication and multicast communication can be used, so that the amount of processing at the base station for frequency resource control in the cell can be reduced.

Further, as in the third embodiment, RBs in which to place DMRSs may be set in a specific band instead of arranging DMRSs in the same pattern in the entire band of the cell. A plurality of sets of specific bands may be provided. As information for setting a specific band, the information in (2-1) to (2-4) illustrated in the third embodiment may be used. Also in this case, information common to unicast communication and multicast communication can be used, so that the amount of processing at the base station for frequency resource control in the cell can be reduced.

In multicast communication, a cell-specific inter-RB DMRS arrangement may be fixed. For example, a cell-specific inter-RB DMRS arrangement may be statically determined in advance according to a standard or the like. As inter-RB DMRS arrangement, the same method as the method described in the third embodiment may be used. In this case, an inter-RB DMRS arrangement is shared by unicast communication and multicast communication, so that it is possible to prevent the occurrence of interference due to the contention of the DMRS arrangement between the multicast communication and the unicast communication.

Further, as in the third embodiment, RBs in which to place DMRSs may be the same in all cells. One or more cells may be grouped, and RBs in which to place DMRSs may be varied from group to group. As another example, RBs in which to place DMRSs may be varied from cell to cell in a group, and they may be set the same or uncorrelated between groups. By enabling such flexible setting, a per-RB DMRS arrangement can be set appropriately for cell coverage, a frequency band, a supported service, or the like. Moreover, the system frequency utilization efficiency can be improved.

It has been described that a cell-specific inter-RB DMRS arrangement is determined in advance statically according to a standard or the like. As another method, an inter-RB DMRS arrangement may be notified to terminals from a base station in a cell to which the present embodiment is applied. An example of a method of notification from the base station to the terminals is described below.

The base station broadcasts inter-RB DMRS arrangement information of its own cell to terminals under its control. The base station broadcasts information such as the information for setting a DMRS arrangement (1-1) to (1-4) and the information for setting a specific band (2-1) to (2-4) described in the third embodiment, to the terminals as the inter-RB DMRS arrangement information.

The terminals under the cell can recognize the inter-RB DMRS arrangement of the cell by receiving the information broadcasted from the base station.

The base station may include the above pieces of information to be broadcasted to the terminals in an MIB as broadcast information. Alternatively, the base station may include the above pieces of information to be broadcasted to the terminals in minimum SI. The base station may notify the above pieces of information to be broadcasted to the terminals by the PBCH. The base station may include the above pieces of information to be broadcasted to the terminals in an SIB to broadcast it. As the SIB, for example, the SIB 20 containing information on multicast using SC-PTM may be used.

Another notification method will be described. The base station notifies the terminals under its control of the inter-RB DMRS arrangement information of its own cell by individual signaling. That is, the base station does not broadcast the arrangement information to the terminals, but notifies the arrangement information to the terminals by terminal-specific signaling. The base station may include the inter-RB DMRS arrangement information in terminal-specific information to notify it to the terminals. Thus, terminal-specific necessary information can be individually notified to the terminals. For example, when the inter-RB DMRS arrangement varies from service to service, an inter-RB DMRS arrangement for a service to be supported can be notified to each terminal.

The base station may include the inter-RB DMRS arrangement information in information common to cells to notify it to the terminals. In this case, control is facilitated. The base station may include the inter-RB DMRS arrangement information in terminal-specific SIB information to notify it to the terminals. The base station may notify the inter-RB DMRS arrangement information as, for example, other SI information proposed in 3GPP to the terminals. In this notification method, only terminals that need multicast reception acquire the SI information, so that the amount of processing at terminals that do not need multicast reception can be reduced.

Still another notification method will be described. The base station may notify the terminals of the inter-RB DMRS arrangement information using a multicast channel. The multicast channel used may be the Multicast Control CHannel (MCCH) or the Single Cell-Multicast Control CHannel (SC-MCCH). The base station may include multicast signaling in the multicast channel to notify the terminals of it. That is, the base station may include the inter-RB DMRS arrangement information in multicast signaling. As an example of the signaling, SCPTMConfiguration or MBSFNAreaConfiguration described in the literature "3GPP TS 36.331 v14.2.1" may be used. This notification method also enables notification only to terminals that need multicast reception, and thus can reduce the amount of processing at terminals that do not need multicast reception.

A cell-specific inter-RB DMRS arrangement may be notified from the Multicell Coordination Entity (MCE) to the base station. That is, a cell-specific inter-RB DMRS arrangement may be notified from the MCE to the base station of each cell using an MCE-base station interface (e.g. the M2 interface). The cell-specific inter-RB DMRS arrangement may be notified to the base station of each cell together with other settings involved in multicast communication. In this case, the amount of signaling can be reduced.

A cell-specific inter-RB DMRS arrangement may be notified from the Mobility Management Entity (MME) to the MCE. That is, a cell-specific inter-RB DMRS arrangement may be notified from the MME to the MCE using an MME-MCE interface (e.g. the M3 interface). The MME may use inter-RB DMRS arrangements in other communications (e.g., unicast and other multicast) to determine an inter-RB DMRS arrangement in the multicast. In this case, contention of an inter-RB DMRS arrangement between multicast and other communications can be prevented, so that DMRS interference from the other communications can be prevented.

Moreover, as a multicast communication in the communication system according to the present embodiment, the Multimedia Broadcast multicast service Single Frequency Network (MBSFN) may be used. An inter-RB DMRS arrangement may be determined for each MBSFN area. In this case, an MBSFN identifier (e.g. an MBSFN area ID) may be used in the determination of an inter-RB DMRS arrangement. The base station may notify the terminals of inter-RB DMRS arrangement information using the method described above in the present embodiment or may notify the terminals using MBSFNAreaConfiguration. Instead of the SIB 20, the SIB13 containing information on the MBFSN area may be used. In this case, at a terminal located near the boundary of the MBSFN area, DMRS interference from other cells or other MBSFN areas can be prevented.

The base station of the communication system according to the present embodiment can use frequency resources efficiently and can prevent DMRS interference from other cells, other communications, etc. in multicast communication.

Note that the embodiments described above may be applied to communication using an Extended CP. An example of communication using an Extended CP may be communication between a base station covering a wide area and a terminal, or the MBSFN. This enables efficient use of frequency resources and can prevent DMRS interference from other cells also in communication using an Extended CP.

The configurations described in the above embodiments illustrate examples of an aspect of the present invention, and can be combined with another known art, or can be partly omitted or changed without departing from the scope of the present invention.

For example, in the above-described embodiments and their modifications, a slot is an example of a time unit of communication in the fifth-generation mobile communication system. A scheduling unit may be used instead. The processing described as being performed in slot units in the above-described embodiments and their modifications may be performed in Transmission Time Interval (TTI) units, subframe units, subslot units, or minislot units.

REFERENCE SIGNS LIST

1 base station; 2, 2-1, 2-2, 2-*n* terminal; 11 receiving unit; 12-1, 12-2, 12-3 processing unit; 13 precoding unit; 14 transmitting unit; 21 reception processing unit; 22 demodulation unit; 121 information processing unit; 123 parameter signal generation unit; 124 reference-signal control signal generation unit; 125 data-signal control signal generation unit; 126 reference signal generation unit; 127 data generation unit; 128 multiplexing unit.

The invention claimed is:

1. A transmitting apparatus that allocates, to one terminal, at least one of a plurality of transmission layers and allocates at least one resource block that is a minimum allocation unit of a communication resource in each transmission layer, to transmit a signal to the terminal, the transmitting apparatus comprising:
   processors each associated with one transmission layer of the plurality of transmission layers, the processors being equal in number to the transmission layers,
   each of the processors comprising:
   a reference signal generator to generate a reference signal to be used by the terminal in demodulation processing on a received signal; and
   an information processor to determine, for each cell, the resource block in which to transmit the reference signal to the terminal and the resource block in which to transmit no reference signal to the terminal, on a basis of at least one of a state of a channel between the transmitting apparatus and the terminal or information on the resource block to be used in transmission of the reference signal in an adjacent cell, wherein the information processor selects an arrangement of the resource block to be used in transmission of the reference signal from among a plurality of predetermined arrangements, and the plurality of predetermined arrangements include a plurality of arrangements different in density of the resource block to be used in transmission of the reference signal in a scheduling unit that is a unit in which to allocate the resource block.

2. The transmitting apparatus according to claim 1, wherein
the plurality of arrangements different in density of the resource block to be used in transmission of the reference signal are different in density in a frequency axis direction in the scheduling unit.

3. The transmitting apparatus according to claim 1, wherein the plurality of arrangements different in density of the resource block to be used in transmission of the reference signal are different in density in a time axis direction in the scheduling unit.

4. The transmitting apparatus according to claim 1, wherein
the plurality of predetermined arrangements include a plurality of arrangements that are equal in density of the resource block to be used in transmission of the reference signal in a scheduling unit that is a unit in which to allocate the resource block and that does not coincide in position of the resource blocks to be used in transmission of the reference signal in the scheduling unit.

5. The transmitting apparatus according to claim 1, wherein
an arrangement of the resource block in which to transmit the reference signal varies from terminal to terminal with which the transmitting apparatus communicates.

6. The transmitting apparatus according to claim 1, wherein
an arrangement of the resource block in which to transmit the reference signal is notified to the terminal using information indicating a reference arrangement or density and offset information indicating an offset from the reference arrangement.

7. The transmitting apparatus according to claim 1, wherein
an arrangement of the resource block in which to transmit the reference signal is set on a basis of an identifier of a cell.

8. The transmitting apparatus according to claim 1, wherein
an arrangement of the resource block in which to transmit the reference signal is set on a basis of an identifier of a multicast communication.

9. A receiving apparatus that receives a signal transmitted by the transmitting apparatus according to claim 1, wherein
the receiving apparatus identifies a resource block in which the transmitting apparatus transmits the reference signal and demodulates a data signal using the reference signal contained in the identified resource block.

10. A control circuit for controlling; a transmitting apparatus that allocates, to one terminal, at least one of a plurality of transmission layers and allocates at least one resource block that is a minimum allocation unit of a communication resource in each transmission layer, to transmit a signal to the terminal, and that comprises processors each associated with one transmission layer of the plurality of transmission layers, the processors being equal in number to the transmission layers, the control circuit causing the transmitting apparatus to perform:

generating a reference signal to be used by the terminal in demodulation processing on a received signal;

determining, for each cell, the resource block in which to transmit the reference signal to the terminal and the resource block in which to transmit no reference signal to the terminal, on a basis of at least one of a state of a channel between the transmitting apparatus and the terminal or information on the resource block to be used in transmission of the reference signal in an adjacent cell; and selecting an arrangement of the resource block to be used in transmission of the reference signal from among a plurality of predetermined arrangements, wherein the plurality of predetermined arrangements include a plurality of arrangements different in density of the resource block to be used in transmission of the reference signal in a scheduling unit that is a unit in which to allocate the resource block.

11. A non-transitory computer-readable recording medium storing therein a program for controlling a transmitting apparatus that allocates, to one terminal, at least one of a plurality of transmission layers and allocates at least one resource block that is a minimum allocation unit of a communication resource in each transmission layer, to transmit a signal to the terminal, and that comprises processors each associated with one transmission layer of the plurality of transmission layers, the processors being equal in number to the transmission layers, the program causing the transmitting apparatus to perform:

generating a reference signal to be used by the terminal in demodulation processing on a received signal;

determining, for each cell, the resource block in which to transmit the reference signal to the terminal and the resource block in which to transmit no reference signal to the terminal, on a basis of at least one of a state of a channel between the transmitting apparatus and the terminal or information on the resource block to be used in transmission of the reference signal in an adjacent cell; and selecting an arrangement of the resource block to be used in transmission of the reference signal from among a plurality of predetermined arrangements, wherein the plurality of predetermined arrangements include a plurality of arrangements different in density of the resource block to be used in transmission of the reference signal in a scheduling unit that is a unit in which to allocate the resource block.

* * * * *